US007429433B2

(12) United States Patent
Otsuki et al.

(10) Patent No.: US 7,429,433 B2
(45) Date of Patent: Sep. 30, 2008

(54) POSITIVE ELECTRODE FOR NON-AQUEOUS ELECTROLYTE BATTERY AND METHOD OF PRODUCING THE SAME AND NON-AQUEOUS ELECTROLYTE BATTERY

(75) Inventors: Masashi Otsuki, Kodaira (JP); Shinichi Eguchi, Kodaira (JP); Hiroshi Kanno, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 766 days.

(21) Appl. No.: 10/511,034

(22) PCT Filed: Mar. 28, 2003

(86) PCT No.: PCT/JP03/04038

§ 371 (c)(1),
(2), (4) Date: Oct. 13, 2004

(87) PCT Pub. No.: WO03/090295

PCT Pub. Date: Oct. 30, 2003

(65) Prior Publication Data

US 2005/0153207 A1 Jul. 14, 2005

(30) Foreign Application Priority Data

Apr. 19, 2002 (JP) ............................. 2002-116990
Apr. 19, 2002 (JP) ............................. 2002-117151

(51) Int. Cl.
*H01M 4/50* (2006.01)
*H01M 4/52* (2006.01)
*H01M 10/40* (2006.01)

(52) U.S. Cl. .................... 429/223; 429/224; 429/231.1; 429/231.3; 429/326

(58) Field of Classification Search ................. 429/223, 429/224, 231.1, 231.3, 326; 423/636
See application file for complete search history.

(56) References Cited

U.S. PATENT DOCUMENTS 4,336,315 A 6/1982 Eda et al.
6,475,679 B1 * 11/2002 Tsutiya et al. .............. 429/339
6,955,867 B1 * 10/2005 Otsuki et al. ................ 429/314
7,067,219 B2 * 6/2006 Otsuki et al. ................ 429/326

FOREIGN PATENT DOCUMENTS

EP 0 033 853 A2 8/1981
JP 58-218755 A 12/1983
JP 63-24301 B2 5/1988
JP 7-153496 A 6/1995
JP 2001-102088 A 4/2001

* cited by examiner

*Primary Examiner*—Stephen J. Kalafut
(74) *Attorney, Agent, or Firm*—Sughrue Mion, PLLC

(57) ABSTRACT

In a positive electrode of a non-aqueous electrolyte battery, at least one alkaline earth metal oxide selected from the group consisting of magnesium oxide, calcium oxide and barium oxide is dispersed between particles of an active substance for positive electrode, whereby a discharge capacity or recharge-discharge capacity of the non-aqueous electrolyte battery just after the preparation and after the storing at high temperature is improved.

16 Claims, No Drawings

POSITIVE ELECTRODE FOR NON-AQUEOUS ELECTROLYTE BATTERY AND METHOD OF PRODUCING THE SAME AND NON-AQUEOUS ELECTROLYTE BATTERY

TECHNICAL FIELD

This invention relates to a positive electrode for a non-aqueous electrolyte battery and a method of producing the same as well as a non-aqueous electrolyte battery provided with such a positive electrode, and more particularly to positive electrodes for a non-aqueous electrolyte primary battery and a non-aqueous electrolyte secondary battery and a method of producing the same as well as a non-aqueous electrolyte primary battery and a non-aqueous electrolyte secondary battery provided with such a positive electrode.

BACKGROUND ART

Recently, batteries having a small size, a light weight, a long life and a high energy density are particularly demanded with the rapid advance of electronics as a power source for small-size electronic equipments. In this connection, non-aqueous electrolyte primary batteries such as a lithium primary battery using manganese dioxide as a positive electrode and lithium as a negative electrode and the like are known as one of batteries having a high energy density because an electrode potential of lithium is lowest among metals and an electric capacity per unit volume is large, and many kinds thereof are actively studies. On the other hand, there are developed run-flat tires capable of continuously running up to a repairing service place over a significant distance even if puncture or the like is caused in a pneumatic tire. Based on this, it is proposed to arrange on the run-flat tire an internal pressure alarm device which measures a tire internal pressure and transmits an accident-informing signal when the internal pressure is dropped to not more than a constant value. As a power source for the internal pressure alarm device is used the non-aqueous electrolyte primary battery having a small size, a light weight, a long life and a high energy density and using manganese dioxide as a positive electrode and lithium as a negative electrode.

In the above non-aqueous electrolyte primary battery, lithium is frequently used as a material forming the negative electrode. However, since lithium violently reacts with a compound having an active proton such as water or alcohol, an electrolyte to be used is limited to a non-aqueous solution or a solid electrolyte. Since the solid electrolyte is low in the ion conductivity, it is limited only to the use at a low discharge current. Therefore, the electrolyte usually used at the present time is an aprotic organic solvent such as ester based organic solvent or the like.

On the other hand, nickel-cadmium batteries were particularly the main current as a secondary cell for backing up memories in AV-information equipments such as personal computers, VTR and the like or a power source for driving them. Recently, non-aqueous electrolyte secondary batteries are considerably noticed instead of the nickel-cadmium battery because they are high in the voltage and have a high energy density and develop an excellent self-discharge characteristic, and hence various developments are attempted and a part thereof is commercialized. For example, a greater number of note-type personal computers, mobile phones and so on are driven by such a non-aqueous electrolyte secondary battery.

In the non-aqueous electrolyte secondary battery, since lithium-containing composite oxide is used as a material forming a positive electrode and carbon is frequently used as a material forming a negative electrode, various organic solvents are used as an electrolyte for the purpose of reducing a risk when lithium is formed on the surface and rendering a driving voltage into a higher level. Also, an alkali metal or the like (particularly, lithium metal or lithium alloy) is used as a negative electrode in the non-aqueous electrolyte secondary battery for a camera, so that an aprotic organic solvent such as ester type organic solvent or the like is usually used as an electrolyte.

DISCLOSURE OF THE INVENTION

Although the non-aqueous electrolyte primary battery has a small size, a light weight, a long life and a high energy density as mentioned above, it is demanded to upgrade the function of the internal pressure alarm device so as to transmit various information of the tire in addition to the tire internal pressure, and a power consumption is increased accompanied therewith, so that there are caused problems that the service life becomes short and the exchange is required in a short time when the existing non-aqueous electrolyte primary batteries are used in the power source for such an internal pressure alarm device. Also, since the temperature range of the tire used is wider, it is required to further improve the high-temperature characteristics of the battery considering the use in desert and the like.

Furthermore, the material for the negative electrode in the non-aqueous electrolyte primary battery is a lithium metal or a lithium alloy and is very high in the activity to water, so that there is a problem that when the sealing of the battery is incomplete and water is penetrated into the battery, the negative electrode material reacts with water to produce hydrogen or cause ignition and hence the risk becomes high. In addition, since the lithium metal is low in the melting point (about 170° C.), as a large current rapidly flows in the short-circuiting or the like, there is a problem that the battery abnormally generates heat to cause a very risky state such as the fusion of the battery or the like. Further, there is a problem that the electrolyte based on the organic solvent is vaporized and decomposed accompanied with the above heat generation of the battery to produce a gas or the explosion-ignition of the battery is caused by the produced gas or the like. Moreover, even in the non-aqueous electrolyte primary battery not naturally assuming the recharge, there is a problem that the recharge may be carried out by wrong operation and in this case the ignition is caused.

On the other hand, the existing non-aqueous electrolyte secondary batteries are high in the energy density as compared with the nickel-cadmium battery, so that there is an advantage that the recharge-discharge capacity is high. However, in order to further mitigate the burden of the user for recharging, it is required to further improve the recharge-discharge capacity. Also, since the temperature range of the battery stored is wider, there is a problem that the recharge-discharge capacity lowers when the battery is particularly stored under a high-temperature environment.

Further, when an alkali metal (particularly lithium metal, lithium alloy or the like) is used as the negative electrode in the non-aqueous electrolyte secondary battery, since the alkali metal is very high in the activity to water content, there is a problem that if water is penetrated into the battery due to incomplete sealing thereof or the like, risks of generating hydrogen by reacting the negative electrode material with water, ignition and the like become high. Also, since the lithium metal is low in the melting point (about 170° C.), there is a problem that if a large current violently flows in short-circuiting or the like, there is caused a very risky state that the battery abnormally generates heat to cause the fusion of the battery or the like. Further, there is a problem that the electrolyte based on the above organic solvent is vaporized or decomposed accompanied with the heat generation of the battery to generate a gas or the explosion-ignition of the battery are caused by the generated gas.

It is, therefore, an object of the invention to provide a non-aqueous electrolyte primary battery having a high discharge capacity and developing an excellent discharge characteristic even after the storing at higher temperatures. Also, it is another object of the invention to provide a non-aqueous electrolyte primary battery having a high safety in addition to the high discharge capacity and the excellent discharge characteristic even after the storing at higher temperatures.

It is the other object of the invention to provide a non-aqueous electrolyte secondary battery having a high recharge-discharge capacity and developing an excellent discharge characteristic even after the storing at higher temperatures. Also, it is a further object of the invention to provide a non-aqueous electrolyte secondary battery having a high safety in addition to the high recharge-discharge capacity and the excellent discharge characteristic even after the storing at higher temperatures.

As a result of various studies for achieving the above objects, the inventors have found that by improving a positive electrode in a non-aqueous electrolyte primary battery using manganese dioxide as an active substance for the positive electrode is obtained a non-aqueous electrolyte primary battery having a high discharge capacity just after the production and a high discharge capacity after the storing at a high temperature, a high output and a long service life, and further by adding a phosphazene derivative and/or an isomer of a phosphazene derivative to an electrolyte is obtained a non-aqueous electrolyte primary battery having higher discharge capacity just after the production and after the storing at the high temperature and a high safety.

Also, the inventors have found that by improving a positive electrode in a non-aqueous electrolyte secondary battery using a lithium-containing composite oxide as an active substance for the positive electrode is obtained a non-aqueous electrolyte secondary battery having a high recharge-discharge capacity just after the production and a high recharge-discharge capacity after the storing at a high temperature, and further by adding a phosphazene derivative and/or an isomer of a phosphazene derivative to an electrolyte is obtained a non-aqueous electrolyte secondary battery having higher recharge-discharge capacity just after the production and after the storing at the high temperature and a high safety.

That is, the invention is as follows:

1. A non-aqueous electrolyte primary battery characterized by dispersing at least one alkaline earth metal oxide selected from the group consisting of magnesium oxide, calcium oxide and barium oxide between particles of manganese dioxide.
2. A non-aqueous electrolyte primary battery according to the item 1, wherein the alkaline earth metal oxide is calcium oxide.
3. A non-aqueous electrolyte primary battery according to the item 1 or 2, wherein a mass of the alkaline earth metal oxide is 0.5-4% based on a mass of manganese dioxide.
4. A non-aqueous electrolyte primary battery according to any one of the items 1 to 3, wherein the alkaline earth metal oxide has a particle size of 10-80 nm.
5. A method of producing a positive electrode for a non-aqueous electrolyte primary battery, which comprises the steps of:
   (I) a step of adding an aqueous solution of at least one alkaline earth metal hydroxide selected from the group consisting of an aqueous solution of magnesium hydroxide, an aqueous solution of calcium hydroxide and an aqueous solution of barium hydroxide to manganese dioxide while cooling below 15° C. and then mixing them with stirring to prepare a mixed solution;
   (II) a step of raising a temperature of the mixed solution to 45-55° C. at a rate of 1-10° C./min to reduce a water content of the mixed solution and further to 65-85° C. at a rate of 10-15° C./min to remove the water content of the mixed solution to thereby form a mixture of manganese dioxide and alkaline earth metal hydroxide;
   (III) a step of raising a temperature of the mixture to 290-310° C. and holding at this temperature for a given time to convert the alkaline earth metal hydroxide into an alkaline earth metal oxide to thereby prepare powder for a positive electrode dispersing the alkaline earth metal oxide between particles of manganese dioxide; and
   (IV) a step of shaping the powder for a positive electrode to produce a positive electrode.
6. A method of producing a positive electrode for a non-aqueous electrolyte primary battery according to the item 5, wherein the aqueous solution of the alkaline earth metal hydroxide is an aqueous solution of calcium hydroxide.
7. A non-aqueous electrolyte primary battery comprising a positive electrode as described in any one of the items 1 to 4, a negative electrode, and an electrolyte comprising an aprotic organic solvent and a support salt.
8. A non-aqueous electrolyte primary battery according to the item 7, wherein the aprotic organic solvent is added with a phosphazene derivative and/or an isomer of a phosphazene derivative.
9. A non-aqueous electrolyte primary battery according to the item 8, wherein the phosphazene derivative has a viscosity at 25° C. of not more than 300 mPa·s (300 cP) and is represented by the following formula (I) or (II):

(I)

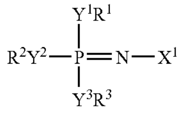

(wherein $R^1$, $R^2$ and $R^3$ are independently a monovalent substituent or a halogen element, $X^1$ is a substituent containing at least one element selected from the group consisting of carbon, silicon, germanium, tin, nitrogen, phosphorus, arsenic, antimony, bismuth, oxygen, sulfur, selenium, tellurium and polonium, and $Y^1$, $Y^2$ and $Y^3$ are independently a bivalent connecting group, a bivalent element or a single bond), or $$(NPR^4_2)_n \quad (II)$$

(wherein $R^4$ is a monovalent substituent or a halogen element, and n is 3-15).

10. A non-aqueous electrolyte primary battery according to the item 9, wherein the phosphazene derivative of the formula (II) is represented by the following formula (III):

$$(NPF_2)_n \quad (III)$$

(wherein n is 3-13).

11. A non-aqueous electrolyte primary battery according to the item 9, wherein the phosphazene derivative of the formula (II) is represented by the following formula (IV):

$$(NPR^5{}_2)_n \quad \text{(IV)}$$

(wherein $R^5$ is a monovalent substituent or a halogen element, and at least one of all $R^5$s is a fluorine-containing monovalent substituent or fluorine, provided that all $R^5$s are not fluorine, and n is 3-8).

12. A non-aqueous electrolyte primary battery according to the item 8, wherein the phosphazene derivative is a solid at 25° C. and is represented by the following formula (V):

$$(NPR^6{}_2)_n \quad \text{(V)}$$

(wherein $R^6$ is a monovalent substituent or a halogen element, and n is 3-6).

13. A non-aqueous electrolyte primary battery according to the item 8, wherein the isomer of the phosphazene derivative is represented by the following formula (VI) and is an isomer of a phosphazene derivative represented by the following formula (VII):

(VI)

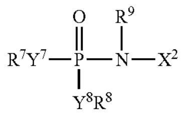

(VII)

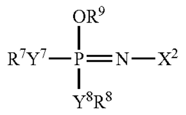

(in the formulae (VI) and (VII), $R^7$, $R^8$ and $R^9$ are independently a monovalent substituent or a halogen element, $X^2$ is a substituent containing at least one element selected from the group consisting of carbon, silicon, germanium, tin, nitrogen, phosphorus, arsenic, antimony, bismuth, oxygen, sulfur, selenium, tellurium and polonium, and $Y^7$ and $Y^8$ are independently a bivalent connecting group, a bivalent element or a single bond).

14. A non-aqueous electrolyte secondary battery characterized by dispersing at least one alkaline earth metal oxide selected from the group consisting of magnesium oxide, calcium oxide and barium oxide between particles of at least one lithium-containing composite oxide selected from the group consisting of $LiCoO_2$, $LiNiO_2$ and $LiMn_2O_4$.

15. A non-aqueous electrolyte secondary battery according to the item 14, wherein the alkaline earth metal oxide is calcium oxide.

16. A non-aqueous electrolyte secondary battery according to the item 14 or 15, wherein a mass of the alkaline earth metal oxide is 0.5-4% based on a mass of the lithium-containing composite oxide.

17. A non-aqueous electrolyte secondary battery according to any one of the items 14 to 16, wherein the alkaline earth metal oxide has a particle size of 10-80 nm.

18. A method of producing a positive electrode for a non-aqueous electrolyte secondary battery, which comprises the steps of:

(I) a step of adding an aqueous solution of at least one alkaline earth metal hydroxide selected from the group consisting of an aqueous solution of magnesium hydroxide, an aqueous solution of calcium hydroxide and an aqueous solution of barium hydroxide to at least one lithium-containing composite oxide selected from the group consisting of $LiCoO_2$, $LiNiO_2$ and $LiMn_2O_4$ while cooling below 15° C. and then mixing them with stirring to prepare a mixed solution;

(II) a step of raising a temperature of the mixed solution to 45-55° C. at a rate of 1-10° C./min to reduce a water content of the mixed solution and further to 65-85° C. at a rate of 10-15° C./min to remove the water content of the mixed solution to thereby form a mixture of lithium-containing composite oxide and alkaline earth metal hydroxide;

(III) a step of raising a temperature of the mixture to 290-310° C. and holding at this temperature for a given time to convert the alkaline earth metal hydroxide into an alkaline earth metal oxide to thereby prepare powder for a positive electrode dispersing the alkaline earth metal oxide between particles of the lithium-containing composite oxide; and (IV) a step of shaping the powder for a positive electrode to produce a positive electrode.

19. A method of producing a positive electrode for a non-aqueous electrolyte secondary battery according to the item 18, wherein the aqueous solution of the alkaline earth metal hydroxide is an aqueous solution of calcium hydroxide.

20. A non-aqueous electrolyte secondary battery comprising a positive electrode as described in any one of the items 14 to 17, a negative electrode, and an electrolyte comprising an aprotic organic solvent and a support salt.

21. A non-aqueous electrolyte secondary battery according to the item 20, wherein the aprotic organic solvent is added with a phosphazene derivative and/or an isomer of a phosphazene derivative.

22. A non-aqueous electrolyte secondary battery according to the item 21, wherein the phosphazene derivative has a viscosity at 25° C. of not more than 300 mPa·s (300 cP) and is represented by the following formula (I) or (II):

(I)

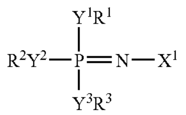

(wherein $R^1$, $R^2$ and $R^3$ are independently a monovalent substituent or a halogen element, $X^1$ is a substituent containing at least one element selected from the group consisting of carbon, silicon, germanium, tin, nitrogen, phosphorus, arsenic, antimony, bismuth, oxygen, sulfur, selenium, tellurium and polonium, and $Y^1$, $Y^2$ and $Y^3$ are independently a bivalent connecting group, a bivalent element or a single bond), or $$(NPR^4{}_2)_n \quad \text{(II)}$$

(wherein $R^4$ is a monovalent substituent or a halogen element, and n is 3-15).

23. A non-aqueous electrolyte secondary battery according to the item 22, wherein the phosphazene derivative of the formula (II) is represented by the following formula (III):

$$(NPF_2)_n \quad \text{(III)}$$

(wherein n is 3-13).

24. A non-aqueous electrolyte secondary battery according to the item 22, wherein the phosphazene derivative of the formula (II) is represented by the following formula (IV):

$$(NPR^5_2)_n \quad (IV)$$

(wherein $R^5$ is a monovalent substituent or a halogen element, and at least one of all $R^5$s is a fluorine-containing monovalent substituent or fluorine, provided that all $R^5$s are not fluorine, and n is 3-8).

25. A non-aqueous electrolyte secondary battery according to the item 21, wherein the phosphazene derivative is a solid at 25° C. and is represented by the following formula (V):

$$(NPR^6_2)_n \quad (V)$$

(wherein $R^6$ is a monovalent substituent or a halogen element, and n is 3-6).

26. A non-aqueous electrolyte secondary battery according to the item 21, wherein the isomer of the phosphazene derivative is represented by the following formula (VI) and is an isomer of a phosphazene derivative represented by the following formula (VII):

(VI)

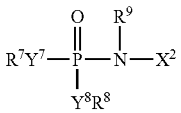

(VII)

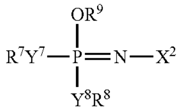

(in the formulae (VI) and (VII), $R^7$, $R^8$ and $R^9$ are independently a monovalent substituent or a halogen element, $X^2$ is a substituent containing at least one element selected from the group consisting of carbon, silicon, germanium, tin, nitrogen, phosphorus, arsenic, antimony, bismuth, oxygen, sulfur, selenium, tellurium and polonium, and $Y^7$ and $Y^8$ are independently a bivalent connecting group, a bivalent element or a single bond).

BEST MODE FOR CARRYING OUT THE INVENTION

The invention will be described in detail below.

<Positive Electrode for Non-aqueous Electrolyte Primary Battery>

The positive electrode for the non-aqueous electrolyte primary battery according to the invention comprises manganese dioxide and an alkaline earth metal oxide dispersed between particles of manganese dioxide, and contains additives usually used in the technical field of the non-aqueous electrolyte primary battery such as an electrically conductive agent, a binding agent and the like, if necessary.

Manganese dioxide used in the invention may be formed by either an electrochemical synthesis or a chemical synthesis. Manganese dioxide is high in the discharge potential and the capacity, excellent in the safety and wettability with an electrolyte and further excellent in the cost among materials usually used as an active substance for a positive electrode in the non-aqueous electrolyte primary battery. The particle size of manganese dioxide is 1-60 μm, preferably 20-40 μm. When the particle size is less than 1 μm or more than 60 μm, the packing is deteriorated in the shaping of the positive electrode combined material (consisting of manganese dioxide, an electrically conductive agent and a binding agent) or the amount of the active substance for positive electrode included per unit volume (amount of manganese dioxide) becomes less, so that the discharge capacity may be undesirably reduced.

As the alkaline earth metal oxide used in the invention are mentioned magnesium oxide (MgO), calcium oxide (CaO) and barium oxide (BaO), which may be used alone or in a combination of two or more. The alkaline earth metal oxide is preferable to be very fine particles, which has a particle size of 10-80 nm, preferably 10-60 nm. When the particle size is less than 10 nm, the synthesis of the particles is industrially difficult, while when it exceeds 80 nm, the amount of manganese dioxide included as the active substance for positive electrode per unit volume decreases and hence the energy quantity per unit volume unfavorably decreases.

In the invention, the alkaline earth metal oxide is dispersed between the particles of manganese dioxide, so that gaps are produced between the particles of manganese dioxide. Since an electrolyte can efficiently penetrate into these gaps, a contact area between the electrolyte and manganese dioxide increases and hence the utilization ratio of manganese dioxide is increased and the discharge capacity and the energy density are improved. Also, since the alkaline earth metal oxide is very high in the water absorbability, a slight amount of water existing in the battery can be removed, whereby reactions between manganese dioxide (positive electrode) and the electrolyte and between lithium (negative electrode) and the electrolyte at higher temperatures can be controlled and high-temperature characteristics of the non-aqueous electrolyte primary battery can be considerably improved. Further, the alkaline earth metal oxide does not obstruct the battery electrode reaction of the non-aqueous electrolyte primary battery and does not cause the lowering of the electric conduction through addition (internal resistance does not rise). Among the above alkaline earth metal oxides, calcium oxide is preferable in view of the safety to environment.

In the positive electrode according to the invention, a mass of the alkaline earth metal oxide is preferable to be from 0.5% to 4% based on a mass of manganese dioxide. When the mass of the alkaline earth metal oxide is less than 0.5% based on the mass of manganese dioxide, the effect of dispersing the alkaline earth metal oxide between the particles of manganese dioxide to form gaps and the effect of removing a slight amount of water existing in the battery are not sufficient, while when it exceeds 4%, the amount of manganese dioxide per unit volume decreases and at the same time the surfaces of the particles of manganese dioxide are covered with the alkaline earth metal oxide to unfavorably lower the contact area between the electrolyte and manganese dioxide.

Among the additives added, if necessary, to the positive electrode for the non-aqueous electrolyte primary battery according to the invention, the electrically conductive agent includes acetylene black and the like, and the binding agent includes polyvinylidene fluoride (PVDF), polytetrafluoroethylene (PTFE) and the like. These additives can be used at the same compounding ratio as the conventional one, for example, a compounding ratio of powder for positive electrode (consisting of manganese dioxide and alkaline earth metal oxide):electrically conductive agent:binding agent=8:1:1 to 8:1:0.2 (by mass).

The shape of the positive electrode is not particularly limited, and can be properly selected from well-known shapes as an electrode. For example, there are mentioned sheet, cylinder, plate, spiral shape and the like.

<Production Method of Positive Electrode for Non-aqueous Electrolyte Primary Battery>

In the positive electrode for the non-aqueous electrolyte primary battery according to the invention, it is preferable to highly disperse vary fine particles of the alkaline earth metal oxide between the particles of manganese dioxide, which can be prepared, for example, by the following method. Moreover, the preparation method is not particularly limited unless the very fine particles of the alkaline earth metal oxide can be highly dispersed between the particles of manganese dioxide.

The positive electrode for lithium primary battery according to the invention can be produced according to the following first to fourth steps. In the first step, an aqueous solution of at least one alkaline earth metal hydroxide selected from the group consisting of an aqueous solution of magnesium hydroxide, an aqueous solution of calcium hydroxide and an aqueous solution of barium hydroxide is added to manganese dioxide while cooling a reaction system below 15° C. and then mixed with stirring to prepare a mixed solution. A method of cooling below 15° C. is not particularly limited, and can be attained, for example, by water cooling. Moreover, the cooling is preferable to be below 4° C. from a viewpoint that the alkaline earth metal oxide is highly dispersed between the particles of manganese dioxide, which can be attained, for example, by ice cooling to not higher than 4° C. In the above aqueous solution, a mass of the alkaline earth metal oxide is preferable to be 3-5 g based on 100 g of water. The stirring is carried out until manganese dioxide and the alkaline earth metal oxide are sufficiently uniformly dispersed into the aqueous solution.

In the second step, the mixed solution prepared in the first step is raised to a temperature range of 45-55° C. at a rate of 1-10° C./min to reduce the water content of the mixed solution. Moreover, it is preferable to reduce the water content to not more than 40% at this stage. Subsequently, the mixed solution is raised to a temperature range of 65-75° C. at a rate of 10-15° C./min to remove the water content of the mixed solution and form a mixture of manganese dioxide and the alkaline earth metal hydroxide. Moreover, it is preferable to evaporate 80-90% of the water content used at this stage. By rendering the temperature rising rate into the above range to gradually evaporate water can be highly dispersed the particles of the alkaline earth metal hydroxide at a fine particle state.

In the third step, the mixture obtained in the second step is raised to a temperature range of 290-310° C. and held at this temperature for a given time to convert the alkaline earth metal hydroxide into an alkaline earth metal oxide to thereby prepare powder for positive electrode dispersing the alkaline earth metal oxide between the particles of manganese dioxide. Since almost all of water is removed at the second step, the temperature rising rate is not particularly limited at the third step. The time holding the alkaline earth metal oxide at the above temperature is a time enough to convert the alkaline earth metal hydroxide into the alkaline earth metal oxide by dehydration. Concretely, a time for converting not less than 98% of the alkaline earth metal hydroxide used into the alkaline earth metal oxide is properly selected. For example, in case of the production scale that manganese dioxide used is about 10 g, power of an objective dehydration ratio is obtained by holding at the above temperature for 2-3 hours. After the completion of the dehydration, the temperature is dropped to room temperature. It is preferable to gradually drop the temperature, which is preferably attained, for example, by air-cooling without blower.

Since calcium oxide is particularly preferable among the alkaline earth metal oxides as mentioned above, an aqueous solution of calcium hydroxide is preferable as an aqueous solution of the alkaline earth metal hydroxide used in the production method of the invention.

In the fourth step, a positive electrode for a non-aqueous electrolyte primary battery is obtained by shaping the powder for positive electrode obtained in the third step. The shaping method is not particularly limited unless the positive electrode can be shaped so as to have a strength of the degree not breaking in the course of producing the non-aqueous electrolyte primary battery, and there can be used conventionally known methods. For instance, the powder for positive electrode can be punched out in a mold corresponding to the shape of the positive electrode for an objective non-aqueous electrolyte primary battery by means of a punching machine. Moreover, a paste is prepared by mixing and milling the powder for positive electrode with the aforementioned electrically conductive agent, binding agent and the like and dried by hot air (100-120° C.) prior to the shaping, which mat be then punched out by the punching machine.

The positive electrode obtained by the above method is at a state that very fine particles (particle size: 10-80 nm) of the alkaline earth metal oxide are highly dispersed between the particles of manganese dioxide, and is a positive electrode for a non-aqueous electrolyte primary battery having a considerably high discharge capacity, a high output and a long service life without largely decreasing the amount of an active substance for positive electrode (amount of manganese dioxide) per unit volume as compared with the positive electrode consisting of only manganese dioxide. Also, the alkaline earth metal oxide is existent in the positive electrode, so that the positive electrode can absorb a slight amount of water existing in the battery, and even if the battery using such a positive electrode is placed under a high-temperature environment, each electrode does not react with the electrolyte and hence the lowering of the discharge capacity is suppressed.

<Positive Electrode for Non-aqueous Electrolyte Secondary Battery>

The positive electrode for the non-aqueous electrolyte secondary battery according to the invention comprises a lithium-containing composite oxide and an alkaline earth metal oxide dispersed between particles of the lithium-containing composite oxide, and contains additives usually used in the technical field of the non-aqueous electrolyte secondary battery such as an electrically conductive agent, a binding agent and the like, if necessary.

The lithium-containing composite oxide is a composite oxide of lithium and a transition metal and is a substance directly contributing to an electromotive reaction as an active substance for the non-aqueous electrolyte secondary battery. As the lithium-containing composite oxide are mentioned $LiCoO_2$, $LiNiO_2$ and $LiMn_2O_4$. These lithium-containing composite oxides may be used alone or in a combination of two or more. The particle size of the lithium-containing composite oxide is 1-60 μm, preferably 20-40 μm. When the particle size is less than 1 μm or more than 60 μm, the packing is deteriorated in the shaping of the positive electrode combined material (consisting of manganese dioxide, an electrically conductive agent and a binding agent) or the amount of the active substance for positive electrode included per unit volume becomes less, so that the recharge-discharge capacity may be undesirably reduced.

As the alkaline earth metal oxide used in the invention are mentioned magnesium oxide (MgO), calcium oxide (CaO) and barium oxide (BaO), which may be used alone or in a combination of two or more. The alkaline earth metal oxide is preferable to be very fine particles, which has a particle size of 10-80 nm, preferably 10-60 nm. When the particle size is less than 10 nm, the synthesis of the particles is industrially difficult, while when it exceeds 80 nm, the amount of manganese dioxide included as the active substance for positive electrode per unit volume decreases and hence the energy quantity per unit volume unfavorably decreases.

In the invention, the alkaline earth metal oxide is dispersed between the particles of the lithium-containing composite oxide, so that gaps are produced between the particles of the lithium-containing composite oxide. Since an electrolyte can efficiently penetrate into these gaps, a contact area between the electrolyte and the lithium-containing composite oxide increases and hence the utilization ratio of the lithium-containing composite oxide is increased and the recharge-discharge is improved. Also, since the alkaline earth metal oxide is very high in the water absorbability, a slight amount of water existing in the battery can be removed, whereby reactions between the lithium-containing composite oxide and the electrolyte and between lithium and the electrolyte at higher temperatures can be controlled and high-temperature characteristics of the non-aqueous electrolyte secondary battery can be considerably improved. Further, the alkaline earth metal oxide does not obstruct the battery electrode reaction of the non-aqueous electrolyte secondary battery and does not cause the lowering of the electric conduction through addition (internal resistance does not rise). Among the above alkaline earth metal oxides, calcium oxide is preferable in view of the safety to environment.

In the positive electrode according to the invention, a mass of the alkaline earth metal oxide is preferable to be from 0.5% to 4% based on a mass of the lithium-containing composite oxide. When the mass of the alkaline earth metal oxide is less than 0.5% based on the mass of the lithium-containing composite oxide, the effect of dispersing the alkaline earth metal oxide between the particles of the lithium-containing composite oxide to form gaps and the effect of removing a slight amount of water existing in the battery are not sufficient, while when it exceeds 4%, the amount of the active substance for positive electrode per unit volume decreases and at the same time the surfaces of the particles of the lithium-containing composite oxide are covered with the alkaline earth metal oxide to unfavorably lower the contact area between the electrolyte and the lithium-containing composite oxide.

Among the additives added, if necessary, to the positive electrode for the non-aqueous electrolyte secondary battery according to the invention, the electrically conductive agent includes acetylene black and the like, and the binding agent includes polyvinylidene fluoride (PVDF), polytetrafluoroethylene (PTFE) and the like. These additives can be used at the same compounding ratio as the conventional one, for example, a compounding ratio of powder for positive electrode (consisting of lithium-containing composite oxide and alkaline earth metal oxide):electrically conductive agent: binding agent=8:1:1 to 8:1:0.2 (by mass).

The shape of the positive electrode is not particularly limited, and can be properly selected from well-known shapes as an electrode. For example, there are mentioned sheet, cylinder, plate, spiral shape and the like.

<Production Method of Non-aqueous Electrolyte Secondary Battery>

In the positive electrode for the non-aqueous electrolyte secondary battery according to the invention, it is preferable to highly disperse vary fine particles of the alkaline earth metal oxide between the particles of lithium-containing composite oxide, which can be prepared, for example, by the following method. Moreover, the preparation method is not particularly limited unless the very fine particles of the alkaline earth metal oxide can be highly dispersed between the particles of the lithium-containing composite oxide.

The positive electrode for the non-aqueous electrolyte secondary battery according to the invention can be produced according to the following first to fourth steps. In the first step, an aqueous solution of at least one alkaline earth metal hydroxide selected from the group consisting of an aqueous solution of magnesium hydroxide, an aqueous solution of calcium hydroxide and an aqueous solution of barium hydroxide is added to at least one lithium-containing composite oxide selected from the group consisting of $LiCoO_2$, $LiNiO_2$ and $LiMn_2O_4$ while cooling a reaction system below 15° C. and then mixed with stirring to prepare a mixed solution. A method of cooling below 15° C. is not particularly limited, and can be attained, for example, by water cooling. Moreover, the cooling is preferable to be below 4° C. from a viewpoint that the alkaline earth metal oxide is highly dispersed between the particles of the lithium-containing composite oxide, which can be attained, for example, by ice cooling to not higher than 4° C. In the above aqueous solution, a mass of the alkaline earth metal oxide is preferable to be 3-5 g based on 100 g of water. The stirring is carried out until the lithium-containing composite oxide and the alkaline earth metal oxide are sufficiently uniformly dispersed into the aqueous solution.

In the second step, the mixed solution prepared in the first step is raised to a temperature range of 45-55° C. at a rate of 1-10° C./min to reduce the water content of the mixed solution. Moreover, it is preferable to reduce the water content to not more than 40% at this stage. Subsequently, the mixed solution is raised to a temperature range of 65-75° C. at a rate of 10-15° C./min to remove the water content of the mixed solution and form a mixture of the lithium-containing composite oxide and the alkaline earth metal hydroxide. Moreover, it is preferable to evaporate 80-90% of the water content used at this stage. By rendering the temperature rising rate into the above range to gradually evaporate water can be highly dispersed the particles of the alkaline earth metal hydroxide at a fine particle state.

In the third step, the mixture obtained in the second step is raised to a temperature range of 290-310° C. and held at this temperature for a given time to convert the alkaline earth metal hydroxide into an alkaline earth metal oxide to thereby prepare powder for positive electrode dispersing the alkaline earth metal oxide between the particles of the lithium-containing composite oxide. Since almost all of water is removed at the second step, the temperature rising rate is not particularly limited at the third step. The time holding the alkaline earth metal oxide at the above temperature is a time enough to convert the alkaline earth metal hydroxide into the alkaline earth metal oxide by dehydration. Concretely, a time for converting not less than 98% of the alkaline earth metal hydroxide used into the alkaline earth metal oxide is properly selected. For example, in case of the production scale that the lithium-containing composite oxide used is about 10 g, power of an objective dehydration ratio is obtained by holding at the above temperature for 2-3 hours. After the completion of the dehydration, the temperature is dropped to room temperature. It is preferable to gradually drop the temperature, which is preferably attained, for example, by air-cooling without blower.

Since calcium oxide is particularly preferable among the alkaline earth metal oxides as mentioned above, an aqueous solution of calcium hydroxide is preferable as an aqueous solution of the alkaline earth metal hydroxide used in the production method of the invention.

In the fourth step, a positive electrode for a non-aqueous electrolyte secondary battery is obtained by shaping the powder for positive electrode obtained in the third step. The shaping method is not particularly limited unless the positive electrode can be shaped so as to have a strength of the degree not breaking in the course of producing the non-aqueous electrolyte secondary battery, and there can be used conventionally known methods. For instance, the powder for positive electrode is mixed and milled with the additives such as the aforementioned electrically conductive agent, binding agent and the like and an organic solvent such as ethyl acetate, ethanol or the like, which may be subjected to a rolling through rollers to prepare a sheet having desired thickness and width.

The positive electrode obtained by the above method is at a state that very fine particles (particle size: 10-80 nm) of the alkaline earth metal oxide are highly dispersed between the particles of the lithium-containing composite oxide, and is a positive electrode for a non-aqueous electrolyte secondary battery having a considerably high recharge-discharge capacity, a high output and a long service life without largely decreasing the amount of an active substance for positive electrode (amount of lithium-containing composite oxide) per unit volume as compared with the positive electrode consisting of only the lithium-containing composite oxide. Also, the alkaline earth metal oxide is existent in the positive electrode, so that the positive electrode can absorb a slight amount of water existing in the battery, and even if the battery using such a positive electrode is placed under a high-temperature environment, each electrode does not react with the electrolyte and hence the lowering of the discharge capacity is suppressed.

<Non-aqueous Electrolyte Battery>

The non-aqueous electrolyte battery according to the invention comprises the aforementioned positive electrode, a negative electrode and an electrolyte comprising an aprotic organic solvent and a support salt, and is provided with members usually used in the technical field of the non-aqueous electrolyte battery such as a separator and the like, if necessary.

-Negative Electrode-

The material for the negative electrode in the non-aqueous electrolyte battery according to the invention partly differs between the primary battery and the secondary battery. For example, as a negative electrode for the non-aqueous electrolyte primary battery are mentioned lithium metal, lithium alloy and the like. As a metal alloying with lithium are mentioned Sn, Pb, Al, Au, Pt, In, Zn, Cd, Ag, Mn and the like. Among them, Al, Zn and Mg are preferable from a viewpoint of amount of deposit and toxicity. These materials may be used alone or in a combination of two or more.

As a negative electrode for the non-aqueous electrolyte secondary battery are preferably mentioned lithium metal, alloy of lithium with Al, In, Pb, Zn or the like, a carbon material such as graphite doped with lithium or the like, and so on. Among them, the carbon material such as graphite or the like is preferable in view of a higher safety. These materials may be used alone or in a combination of two or more.

The shape of the negative electrode is not particularly limited, and may be properly selected from the same known shapes as described on the shape of the positive electrode.

-Non-aqueous Electrolyte-

The electrolyte in the non-aqueous electrolyte battery according to the invention comprises an aprotic organic solvent and a support salt. Since the negative electrode for the non-aqueous electrolyte battery contains an alkali metal such as lithium or the like as mentioned above, it is very high in the reactivity with water, so that the aprotic organic solvent not reacting with water is used as a solvent. The aprotic organic solvent is made possible to lower the viscosity of the electrolyte and can easily attain an optimum ion conduction as a battery.

-Aprotic Organic Solvent-

The aprotic organic solvent constituting the electrolyte for the non-aqueous electrolyte battery of the invention is not particularly limited, and includes ether compounds, ester compounds and the like from a viewpoint that the viscosity of the electrolyte is controlled to a low value. Concretely, there are preferably mentioned 1,2-dimethoxyethane (DME), tetrahydrofuran, dimethyl carbonate, diethyl carbonate (DEC), diphenyl carbonate, ethylene carbonate (EC), propylene carbonate (PC), γ-butyrolactone (GBL), γ-valerolactone, methylethyl carbonate, ethylmethyl carbonate and the like.

Among them, a cyclic ester compound such as propylene carbonate, γ-butyrolactone or the like, a chain ester compound such as dimethyl carbonate, methylethyl carbonate or the like, a chain ether compound such as 1,2-dimethoxyethane or the like are preferable in case of using in the non-aqueous electrolyte primary battery, and a cyclic ester compound such as ethylene carbonate, propylene carbonate, γ-butyrolactone or the like, a chain ester compound such as dimethyl carbonate, ethylmethyl carbonate, diethyl carbonate or the like, a chain ether compound such as 1,2-dimethoxyethane or the like are preferable in case of using in the non-aqueous electrolyte secondary battery. The cyclic ester compound is high in the dielectric constant and excellent in the solubility of the above support salt, while the chain ester and ether compounds are low in the viscosity and preferably lower the viscosity of the electrolyte. They may be used alone or in a combination of two or more. The viscosity at 25° C. of the aprotic organic solvent is not particularly limited, but is preferably not more than 3.0 mPa·s (3.0 cP), more preferably not more than 2.0 mPa·s (2.0 cP).

-Support Salt-

As the support salt, a support salt or the like forming an ionic source for lithium ion is preferable. The ionic source for lithium ion is not particularly limited, but there are preferably mentioned lithium salts such as $LiClO_4$, $LiBF_4$, $LiPF_6$, $LiCF_3SO_3$, $LiAsF_6$, $LiC_4F_9SO_3$, $Li(CF_3SO_2)_2N$, $Li(C_2F_5SO_2)_2N$ and the like. They may be used alone or in a combination of two or more.

The content of the support salt in the electrolyte is preferably 0.2-1 mol, more preferably 0.5-1 mol per 1 kg of the solvent component in case of the primary battery, and is preferably 0.2-1 mol, more preferably 0.5-1 mol per 1 kg of the solvent component in case of the secondary battery, When the content is less than 0.2 mol, the sufficient electric conduction of the electrolyte can not be ensured, and troubles may be caused in the discharge characteristic of the battery in case of the primary battery and in the recharge-discharge characteristic of the battery in case of the secondary battery, while when it exceeds 1 mol, the viscosity of the electrolyte increases and the sufficient mobility of lithium ion can not be ensured and hence the sufficient electric conduction of the electrolyte can not be ensured likewise the above to raise solution resistance, and troubles may be caused in the pulse discharge and low-temperature characteristic in case of the primary battery and in the recharge-discharge characteristic in case of the secondary battery.

-Phosphazene Derivative and/or Isomer of Phosphazene Derivative-

It is preferable to add a phosphazene derivative and/or an isomer of a phosphazene derivative to the aprotic organic solvent.

In the non-aqueous electrolyte primary battery, by dispersing the alkali earth metal oxide into the particles of manganese dioxide as previously mentioned, the discharge capacities just after the production of the non-aqueous electrolyte primary battery and after the storing at the high temperature can be improved. Further, by adding the phosphazene derivative and/or the isomer of the phosphazene derivative to the aprotic organic solvent, the discharge capacities just after the production and after the storing at the high temperature can be more improved to obtain a non-aqueous electrolyte primary battery having a higher output and a longer service life.

In the conventional electrolyte of the non-aqueous electrolyte primary battery based on the aprotic organic solvent, when a large current rapidly flows in the short-circuiting to abnormally generate heat in the battery, it is high in the risk that the electrolyte is vaporized and decomposed to produce a gas and the explosion-ignition of the battery is caused by the produced gas and heat and also it is high in the risk that the battery is ignited by sparks produced in the short-circuiting to cause the explosion-ignition. If the phosphazene derivative and/or the isomer of the phosphazene derivative is included in the conventional electrolyte, the vaporization-decomposition of the electrolyte at a relatively low temperature of not higher than about 200° C. is suppressed to reduce the risk of the explosion-ignition, and even if the ignition is caused in the interior of the battery by the fusion of the negative electrode material or the like, the risk of catching fire is low. Further, phosphorus has an action of controlling chain decomposition of high molecular weight material constituting the battery, so that the risk of firing-ignition is effectively reduced. In addition, if the phosphazene derivative and/or the isomer of the phosphazene derivative is included in the conventional electrolyte, it is possible to provide a non-aqueous electrolyte primary battery having excellent low-temperature and high-temperature characteristics. Furthermore, the phosphazene derivative and the isomer of the phosphazene derivative have a potential window sufficient to function as a primary battery and do not decompose through discharging. Moreover, the phosphazene derivative containing a halogen (e.g. fluorine) and the isomer of such a phosphazene derivative function as an active radical catching agent if unexpected burning occurs, while the phosphazene derivative having an organic substituent and the isomer of such a phosphazene derivative produce carbide (char) on the electrode material and the separator in the burning and have an effect of shutting off oxygen. In addition, if the recharging is accidentally carried out by the user, since the phosphazene derivative and the isomer of the phosphazene derivative have an effect of controlling the formation of dendrite, the safety becomes higher as compared with the system containing no phosphazene derivative.

On the other hand, in the non-aqueous electrolyte secondary battery, by dispersing the alkali earth metal oxide into the particles of the lithium-containing composite oxide as previously mentioned, the recharge-discharge capacities just after the production of the non-aqueous electrolyte secondary battery and after the storing at the high temperature can be improved. Further, by adding the phosphazene derivative and/or the isomer of the phosphazene derivative to the aprotic organic solvent, the recharge-discharge capacities just after the production and after the storing at the high temperature can be more improved.

In the conventional electrolyte of the non-aqueous electrolyte secondary battery based on the aprotic organic solvent, when a large current rapidly flows in the short-circuiting to abnormally generate heat in the battery, it is high in the risk that the electrolyte is vaporized and decomposed to produce a gas and the explosion-ignition of the battery is caused by the produced gas and heat, so that the risk becomes high. If the phosphazene derivative and/or the isomer of the phosphazene derivative is included in the conventional electrolyte, the vaporization-decomposition of the electrolyte at a relatively low temperature of not higher than about 200° C. is suppressed to reduce the risk of the explosion-ignition. Even if the ignition is caused in the interior of the battery by the fusion of the negative electrode material or the like, the risk of catching fire is low. Further, phosphorus has an action of controlling chain decomposition of high molecular weight material constituting the battery, so that the risk of fire-ignition is effectively reduced, and it is possible to provide a non-aqueous electrolyte secondary battery possessing excellent battery characteristics such as a high voltage, a high discharge capacity, a large current dischargeability and the like. Furthermore, if the phosphazene derivative and/or the isomer of the phosphazene derivative is included in the conventional electrolyte, it is possible to provide a non-aqueous electrolyte primary battery having excellent low-temperature and high-temperature characteristics. Moreover, the phosphazene derivative containing a halogen (e.g. fluorine) and the isomer of such a phosphazene derivative function as an active radical catching agent if unexpected burning occurs, while the phosphazene derivative having an organic substituent and the isomer of such a phosphazene derivative produce carbide (char) on the electrode material and the separator in the burning and have an effect of shutting off oxygen. Even in the recharging, since the phosphazene derivative and the isomer of the phosphazene derivative have an effect of controlling the formation of dendrite, the safety becomes higher as compared with the system containing no phosphazene derivative.

In the invention, the risk of fire-ignition is evaluated by measuring an oxygen index according to JIS K7201. Moreover, the term "oxygen index" used herein means a value of a minimum oxygen concentration required when the burning of the material is maintained under given test conditions defined in JIS K7201 and represented by a volume percentage, in which the lower the oxygen index value, the higher the risk of fire-ignition, and the higher the oxygen index value, the lower the risk of firing-ignition. In the invention, the risk of fire-ignition is evaluated by a limit oxygen index according to the above oxygen index.

It is preferable that the electrolyte added with the phosphazene derivative and/or the isomer of the phosphazene derivative has a limit oxygen index of not less than 21% by volume. When the limit oxygen index is less than 21% by volume, the effect of controlling the fire-ignition may be insufficient. Since the oxygen index under atmospheric condition is 20.2% by volume, the limit oxygen index of 20.2% by volume means that combustion occurs in atmosphere. The inventors have made various studies and found that the self-extinguishing property is developed at the limit oxygen index of not less than 21% by volume, and the flame retardance is developed at not less than 23% by volume, and the incombustibility is developed at not less than 25% by volume.

Moreover, the terms "self-extinguishing property, flame retardance, incombustibility" used herein are defined in the method according to UL 94HB method, wherein when a test piece of 127 mm×12.7 mm is prepared by impregnating 1.0 mL of an electrolyte into an incombustible quartz fiber and is ignited under atmospheric environment, the self-extinguishing property indicates a case that the ignited flame is extinguished in a line between 25 mm and 100 mm and an object fallen down from a net is not fired, and the flame retardance indicates a case that the ignited flame does not arrive at a line of 25 mm of the apparatus and the object fallen down from the net is not fired, and the incombustibility indicates a case that no ignition is observed (combustion length: 0 mm).

The phosphazene derivative added to the aprotic organic solvent is not particularly limited. However, from a viewpoint that the viscosity is relatively low and the support salt is well dissolved, a phosphazene derivative having a viscosity at 25° C. of not more than 300 mPa·s (300 cP) and represented by the following formula (I) or (II) is preferable.

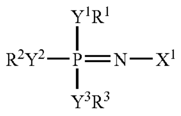

(I)

(wherein $R^1$, $R^2$ and $R^3$ are independently a monovalent substituent or a halogen element, $X^1$ is a substituent containing at least one element selected from the group consisting of carbon, silicon, germanium, tin, nitrogen, phosphorus, arsenic, antimony, bismuth, oxygen, sulfur, selenium, tellurium and polonium, and $Y^1$, $Y^2$ and $Y^3$ are independently a bivalent connecting group, a bivalent element or a single bond), or $$(NPR^4{}_2)_n \quad \text{(II)}$$

(wherein $R^4$ is a monovalent substituent or a halogen element, and n is 3-15).

The viscosity at 25° C. of the phosphazene derivative of the formula (I) or (II) is required to be not more than 300 mPa·s (300 cP), preferably not more than 100 mPa·s (100 cP), further preferably not more than 20 mPa·s (20 cP), particularly not more than 5 mPa·s (5 cP). When the viscosity exceeds 300 mPa·s (300 cP), the support saly is hardly dissolved, and the wettability onto the separator or the like lowers, and the ion electric conductivity is considerably decreased by the increase of viscous resistance of the electrolyte, and particularly performances are lacking in the use under low-temperature conditions such as not higher than freezing point and the like. Also, these phosphazene derivatives are liquid and have an electric conductivity equal to that of the usually liquid electrolyte and indicate excellent cycle characteristic in case of using in the electrolyte for the secondary battery.

In the formula (I), $R^1$, $R^2$ and $R^3$ are not particularly limited unless they are a monovalent substituent or a halogen element. As the monovalent substituent are mentioned an alkoxy group, an alkyl group, a carboxyl group, an acyl group, an aryl group and the like. Among them, the alkoxy group is preferable in a point that the viscosity of the electrolyte can be made low. As the halogen element are preferably fluorine, chlorine, bromine and the like. All of $R^1$-$R^3$ may be the same kind of the substituent, or some of them may be different kinds of the substituents.

As the alkoxy group are mentioned, for example, methoxy group, ethoxy group, propoxy group, butoxy group, and an alkoxy-substituted alkoxy group such as methoxyethoxy group, methoxyethoxyethoxy group or the like. Among them, all of $R^1$-$R^3$ are preferable to be methoxy group, ethoxy group, methoxyethoxy group or methoxyethoxyethoxy group, and are particularly preferable to be methoxy group or ethoxy group from a viewpoint of low viscosity and high dielectric constant. As the alkyl group are mentioned methyl group, ethyl group, propyl group, butyl group, pentyl group and the like. As the acyl group are mentioned formyl group, acetyl group, propionyl group, butyryl group, isobutyryl group, valeryl group and the like. As the aryl group are mentioned phenyl group, tolyl group, naphthyl group and the like. In these monovalent substituents, hydrogen element is preferable to be substituted with a halogen element. As such a halogen element, fluorine, chlorine and bromine are preferable, and fluorine is particularly preferable, and chlorine is next preferable. In the secondary battery, when fluorine is used, there is a tendency that the cycle characteristics are good as compared with chlorine.

In the formula (I), as the bivalent connecting group shown by $Y^1$, $Y^2$ and $Y^3$ are mentioned, for example, $CH_2$ group, and a bivalent connecting group containing at least one element selected from the group consisting of oxygen, sulfur, selenium, nitrogen, boron, aluminum, scandium, gallium, yttrium, indium, lanthanum, thallium, carbon, silicon, titanium, tin, germanium, zirconium, lead, phosphorus, vanadium, arsenic, niobium, antimony, tantalum, bismuth, chromium, molybdenum, tellurium, polonium, tungsten, iron, cobalt and nickel. Among them, $CH_2$ group and the bivalent group containing at least one element selected from the group consisting of oxygen, sulfur, selenium and nitrogen are preferable, and the bivalent connecting group containing sulfur and/or selenium is particularly preferable. Also, $Y^1$, $Y^2$ and $Y^3$ may be a bivalent element such as oxygen, sulfur, selenium or the like, or a single bond. All of $Y^1$-$Y^3$ may be the same kind, or some of them may be different kinds.

In the formula (I), $X^1$ is preferable to be a substituent containing at least one element selected from the group consisting of carbon, silicon, nitrogen, phosphorus, oxygen and sulfur from a viewpoint of the consideration on toxicity, environment and the like. Among these substituents, a substituent represented by the following formula (VIII), (IX) or (X) is more preferable.

(VIII)

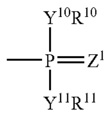

(IX)

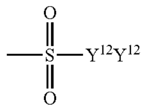

(X)

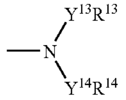

In the formulae (VIII), (IX) and (X), $R^{10}$-$R^{14}$ are independently a monovalent substituent or a halogen element, $Y^{10}$-$Y^{14}$ are independently a bivalent connecting group, a bivalent element or a single bond, and $Z^1$ is a bivalent group or a bivalent element.

As $R^{10}$-$R^{14}$ in the formulae (VIII), (IX) and (X) are preferably mentioned the same monovalent substituents or halogen elements as described in $R^1$-$R^3$ of the formula (I). They may be the same kind in the same substituent, or some of them may be different kinds. Also, $R^{10}$ and $R^{11}$ in the formula (VIII), and $R^{13}$ and $R^{14}$ in the formula (X) may be bonded to each other to form a ring.

As the group shown by $Y^{10}$-$Y^{14}$ in the formulae (VIII), (IX) and (X) are mentioned the same bivalent connecting groups, bivalent elements and the like as described in $Y^1$-$Y^3$ of the formula (I). Similarly, the group containing sulfur and/or selenium is particularly preferable because the risk of fire-ignition of the electrolyte is reduced. They may be the same kind in the same substituent, or some of them may be different kinds.

As $Z^1$ in the formula (VIII) are mentioned, for example, $CH_2$ group, CHR group (R is an alkyl group, an alkoxyl group, phenyl group or the like, and so forth), NR group, a bivalent group containing at least one element selected from the group consisting of oxygen, sulfur, selenium, nitrogen, boron, aluminum, scandium, gallium, yttrium, indium, lanthanum, thallium, carbon, silicon, titanium, tin, germanium, zirconium, lead, phosphorus, vanadium, arsenic, niobium, antimony, tantalum, bismuth, chromium, molybdenum, tellurium, polonium, tungsten, iron, cobalt and nickel, and the like. Among them, $CH_2$ group, CHR group. NR group and the bivalent group containing at least one element selected from the group consisting of oxygen, sulfur and selenium is preferable. Particularly, the bivalent group containing sulfur and/or selenium is preferable because the risk of fire-ignition of the electrolyte is reduced. Also, $Z^1$ may be a bivalent element such as oxygen, sulfur, selenium or the like.

Among these substituents, the substituent containing phosphorus as represented by the formula (VIII) is particularly preferable in a point that the risk of fire-ignition can be effectively reduced. Also, the substituent containing sulfur as represented by the formula (IX) is particularly preferable in a point that the interfacial resistance of the electrolyte can be made small.

In the formula (II), $R^4$ is not particularly limited unless it is a monovalent substituent or a halogen element. As the monovalent substituent are mentioned an alkoxy group, an alkyl group, a carboxyl group, an acyl group, an aryl group and the like. Among them, the alkoxy group is preferable in a point that the viscosity of the electrolyte can be made low. As the halogen element are preferably mentioned fluorine, chlorine, bromine and the like. As the alkoxy group are mentioned, for example, methoxy group, ethoxy group, methoxyethoxy group, propoxy group, phenoxy group and the like. Among them, in case of using in the non-aqueous electrolyte primary battery, methoxy group, ethoxy group, n-propoxy group, phenoxy group are particularly preferable, and in case of using in the non-aqueous electrolyte secondary battery, methoxy group, ethoxy group, methoxyethoxy group and phenoxy group are particularly preferable. In these monovalent substituents, hydrogen element is preferable to be substituted with a halogen element. As such a halogen element are preferably mentioned fluorine, chlorine, bromine and the like. As a substituent substituted with fluorine is mentioned, for example, trifluoroethoxy group.

By properly selecting $R^1$-$R^4$, $R^{10}$-$R^{14}$, $Y^1$-$Y^3$, $Y^{10}$-$Y^{14}$ and $Z^1$ in the formulae (I), (II) and (VIII)-(X), it is possible to synthesize phosphazene derivatives having more preferable viscosity, a solubility suitable for adding-mixing and the like. These phosphazene derivatives may be used alone or in a combination of two or more.

Among the phosphazene derivatives of the formula (II), a phosphazene derivative represented by the following formula (III) is particularly preferable from a viewpoint that the viscosity of the electrolyte is made low to improve the low-temperature characteristics of the battery and further improve the deterioration resistance and safety of the electrolyte:

$$(NPF_2)_n \tag{III}$$

(wherein n is 3-13).

The phosphazene derivative of the formula (III) is a low viscosity liquid at room temperature (25° C.) and has an action of descending a solidification point. For this end, by adding this phosphazene derivative to the electrolyte, it is possible to give excellent low-temperature characteristics to the electrolyte, and also the lowering of the electrolyte viscosity is attained, whereby it is possible to provide a non-aqueous electrolyte battery having a low internal resistance and a high electric conductivity. Therefore, it is possible to provide a non-aqueous electrolyte battery developing an excellent discharge characteristic over a long time even if it is used under low-temperature conditions in a place or season of lower atmosphere temperature.

In the formula (III), n is preferably 3-5, more preferably 3-4, particularly 3 in a point that the excellent low-temperature characteristics can be given to the electrolyte and the viscosity of the electrolyte can be made low. When the value of n is small, the boiling point is low and the property of preventing the fire catch in the approaching to flame can be improved. While, as the value of n becomes large, the boiling point becomes high and it can be stably used even at a high temperature. In order to obtain the target performances by utilizing the above property, it is possible to properly select and use plural phosphazene derivatives.

By properly selecting the value of n in the formula (III), it is possible to prepare an electrolyte having a more preferable viscosity, a solubility suitable for the mixing and low-temperature characteristics. These phosphazene derivatives may be used alone or in a combination of two or more.

The viscosity of the phosphazene derivative represented by the formula (III) is not particularly limited unless it is not more than 20 mPa·s (20 cP), but is preferably not more than 10 mPa·s (10 cP), more preferably not more than 5 mPa·s (5 cP). Moreover, the viscosity in the invention is determined by using a viscosity measuring meter (R-type viscometer Model RE500-SL, made by Toki Sangyo Co., Ltd.) and conducting the measurement at each revolution rate of 1 rpm, 2 rpm, 3 rpm, 5 rpm, 7 rpm, 10 rpm, 20 rpm and 50 rpm for 120 seconds to measure a viscosity under the revolution rate when an indication value is 50-60% as an analytical condition.

Among the phosphazene derivatives of the formula (II), from a viewpoint of improving the deterioration resistance and safety of the electrolyte, a phosphazene derivative represented by the following formula (IV) is particularly preferable:

$$(NPR^5_2)_n \tag{IV}$$

(wherein $R^5$ is independently a monovalent substituent or a halogen element, and at least one of all $R^5$s is a fluorine-containing monovalent substituent or fluorine, provided that all $R^5$s are not fluorine, and n is 3-8).

When the phosphazene derivative of the formula (II) is added to the electrolyte, an excellent self-extinguishing property or a flame retardance can be given to the electrolyte to improve the safety of the electrolyte. However, when the phosphazene derivative represented by the formula (IV) in which at least one of all $R^5$s is a fluorine-containing monovalent substituent is added to the electrolyte, it is possible to give a more excellent safety to the electrolyte. Further, when the phosphazene derivative represented by the formula (IV) in which at least one of all $R^5$s is fluorine is added to the electrolyte, it is possible to give a further excellent safety to the electrolyte. That is, the phosphazene derivative represented by the formula (IV) in which at least one of all $R^5$s is a fluorine-containing monovalent substituent or fluorine has an effect of more hardly burning the electrolyte as compared with the phosphazene derivative containing no fluorine, and can give a further excellent safety to the electrolyte.

Moreover, a cyclic phosphazene derivative of the formula (IV) in which all of $R^5$s are fluorine and n is 3 is non-combustible and is large in the effect of preventing fire-catching in the approaching to the flame, but is very low in the boiling point, so that if it is completely evaporated, the remaining aprotic organic solvent or the like is burnt out.

As the monovalent substituent in the formula (IV) are mentioned an alkoxy group, an alkyl group, an acyl group, an aryl group, a carboxyl group and the like, and the alkoxy group is preferable in a point that the improvement of the safety of the electrolyte is particularly excellent. As the alkoxy group are mentioned methoxy group, ethoxy group, n-propoxy group, i-propoxy group, butoxy group, and an alkoxy group-substituted alkoxy group such as methoxyethoxy group or the like. Particularly, methoxy group, ethoxy group and n-propoxy group are preferable in a point that the improvement of the safety of the electrolyte is particularly excellent. Also, methoxy group is preferable in a point that the viscosity of the electrolyte is made low.

In the formula (IV), n is preferably 3-5, more preferably 3-4 in a point that the excellent safety can be given to the electrolyte.

The above monovalent substituent is preferable to be substituted with fluorine. If all of $R^5$s in the formula (IV) is fluorine, at least one monovalent substituent contains fluorine.

The content of fluorine in the phosphazene derivative is preferably 3-70% by weight, more preferably 7-45% by weight. When the content is within the above range, the "excellent safety" as an effect inherent to the invention can be preferably developed.

The molecular structure of the phosphazene derivative represented by the formula (IV) may contain a halogen element such as chlorine, bromine or the like in addition to fluorine. However, fluorine is most preferable, and chlorine is nest preferable. In the secondary battery, the use of fluorine tends to develop the good cycle property as compared with the use of chlorine.

By properly selecting $R^5$ and n in the formula (IV), it is possible to prepare the electrolyte having more preferable safety and viscosity, a solubility suitable for the mixing and the like. The phosphazene derivatives may be used alone or in a combination of two or more.

The viscosity of the phosphazene derivative of the formula (IV) is not particularly limited unless it is not more than 20 mPa·s (20 cP), but it is preferably not more than 10 mPa·s (10 cP), more preferably 5 mPa·s (5 cP) from a viewpoint of the improvement of the electric conductivity and the improvement of the low-temperature characteristics.

As the phosphazene derivative added to the aprotic organic solvent, from a viewpoint that the deterioration resistance and safety of the electrolyte are improved while suppressing the rise of the viscosity in the electrolyte, a phosphazene derivative being solid at 25° C. (room temperature) and represented by the following formula (V) is preferable:

$$(NPR^6{}_2)_n \qquad (V)$$

(wherein $R^6$ is independently a monovalent substituent or a halogen element and n is 3-6).

Since the phosphazene derivative of the formula (V) is solid at room temperature (25° C.), when it is added to the electrolyte, it is dissolved in the electrolyte to raise the viscosity of the electrolyte. However, when the addition amount is a given value as mentioned later, the rising ratio of the viscosity of the electrolyte becomes low and hence there is provided a non-aqueous electrolyte battery having a low internal resistance and a high electric conductivity. In addition, the phosphazene derivative of the formula (V) is soluble in the electrolyte, so that the stability of the electrolyte over a long time is excellent.

In the formula (V), $R^6$ is not particularly limited unless it is a monovalent substituent or a halogen element. As the monovalent substituent are mentioned an alkoxy group, an alkyl group, a carboxyl group, an acyl group, an aryl group and the like. As the halogen element are preferably mentioned halogen elements such as fluorine, chlorine, bromine and the like. Among them, the alkoxy group is preferable in a point that the rise of the viscosity of the electrolyte can be suppressed. As the alkoxy group are preferable methoxy group, ethoxy group, methoxyethoxy group, propoxy group (isopropoxy group, n-propoxy group), phenoxy group, trifluoroethoxy group and the like. Particularly, methoxy group, ethoxy group, propoxy group (isopropoxy group, n-propoxy group), phenoxy group and trifluoroethoxy group are preferable in a point that the rise of the viscosity of the electrolyte can be suppressed. The above monovalent substituent is preferable to contain the above halogen element.

In the formula (V), n is particularly preferable to be 3 or 4 in a point that the rise of the viscosity of the electrolyte can be suppressed.

As the phosphazene derivative of the formula (V) are particularly preferable a structure that $R^6$ is methoxy group and n is 3 in the formula (V), a structure that $R^6$ is at least either methoxy group or phenoxy group and n is 4 in the formula (V), a structure that $R^6$ is ethoxy group and n is 4 in the formula (V), a structure that $R^6$ is isopropoxy group and n is 3 or 4 in the formula (V), a structure that $R^6$ is n-propoxy group and n is 4 in the formula (V), a structure that $R^6$ is trifluoroethoxy group and n is 3 or 4 in the formula (V), and a structure that $R^6$ is phenoxy group and n is 3 or 4 in the formula (V) in a point that the rise of the viscosity of the electrolyte can be suppressed.

By properly selecting the substituent and value of n in the formula (V), it is possible to prepare an electrolyte having a more preferable viscosity, a solubility suitable for the mixing and the like. These phosphazene derivatives may be used alone or in a combination of two or more.

The isomer of the phosphazene derivative added to the aprotic organic solvent is not particularly limited, but from a viewpoint that the low-temperature characteristics of the electrolyte are improved and further the deterioration resistance and safety of the electrolyte are improved, an isomer represented by the following formula (VI) and of a phosphazene derivative represented by the following formula (VII) is preferable:

(VI)

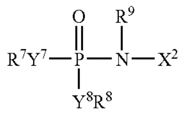

(VII)

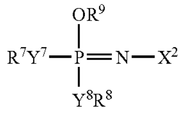

(in the formulae (VI) and (VII), $R^7$, $R^8$ and $R^9$ are independently a monovalent substituent or a halogen element, $X^2$ is a substituent containing at least one element selected from the group consisting of carbon, silicon, germanium, tin, nitrogen, phosphorus, arsenic, antimony, bismuth, oxygen, sulfur, selenium, tellurium and polonium, and $Y^7$ and $Y^8$ are independently a bivalent connecting group, a bivalent element or a single bond).

When the isomer represented by the formula (VI) and of the phosphazene derivative represented by the formula (VII) is added to the electrolyte, it can develop very excellent low-temperature characteristics in the electrolyte.

In the formula (VI), $R^7$, $R^8$ and $R^9$ are not particularly limited unless they are a monovalent substituent or a halogen element. As the monovalent substituent are mentioned an alkoxy group, an alkyl group, a carboxyl group, an acyl group, an aryl group and the like. As the halogen element are preferably mentioned halogen elements such as fluorine, chlorine, bromine and the like. Among them, fluorine and alkoxy group are particularly preferable in view of the low-temperature characteristics and electrochemical stability of the electrolyte. Also, fluorine, alkoxy group and alkoxy group containing fluorine or the like are preferable in a point that the viscosity of the electrolyte is made low. All of $R^7$-$R^9$ may be the same kind of the substituent, or some of them may be different kinds of the substituent.

As the alkoxy group are mentioned, for example, methoxy group, ethoxy group, propoxy group, butoxy group, and alkoxy-substituted alkoxy group such as methoxy ethoxy group, methoxyethoxyethoxy group or the like. Among them, all of $R^7$-$R^9$ are preferable to be methoxy group, ethoxy group, methoxyethoxy group or methoxyethoxyethoxy group, and all of them are particularly preferable to be methoxy group or ethoxy group from a viewpoint of low viscosity and high dielectric constant. As the alkyl group are mentioned methyl group, ethyl group, propyl group, butyl group, pentyl group and the like. As the acyl group are mentioned formyl group, acetyl group, propionyl group, butyryl group, isobutyryl group, valeryl group and the like. As the aryl group are mentioned phenyl group, tolyl group, naphthyl group and the like. In these substituents, hydrogen element is preferable to be substituted with a halogen element. As such a halogen element are preferable fluorine, chlorine and bromine, and among them fluorine is most preferable, and chlorine is next preferable. In the secondary battery, the use of fluorine tends to develop the good cycle property as compared with the use of chlorine.

As the bivalent connecting group shown by $Y^7$ and $Y^8$ in the formula (VI) are mentioned, for example, $CH^2$ group and a bivalent connecting group containing at least one element selected from the group consisting of oxygen, sulfur, selenium, nitrogen, boron, aluminum, scandium, gallium, yttrium, indium, lanthanum, thallium, carbon, silicon, titanium, tin, germanium, zirconium, lead, phosphorus, vanadium, arsenic, niobium, antimony, tantrum, bismuth, chromium, molybdenum, tellurium, polonium, tungsten, iron, cobalt and nickel. Among them, $CH_2$ group and the bivalent connecting group containing at least one element selected from the group consisting of oxygen, sulfur, selenium and nitrogen are preferable. Also, $Y^7$ and $Y^8$ may be a bivalent element such as oxygen, sulfur, selenium or the like, or a single bond. The bivalent connecting group containing sulfur and/or oxygen, oxygen element and sulfur element are particularly preferable in a point that the safety of the electrolyte is improved, and the bivalent connecting group containing oxygen and oxygen element are particularly preferable in a point that the low-temperature characteristics of the electrolyte are excellent. $Y^7$ and $Y^8$ may be the same kind or different kinds.

As $X^2$ in the formula (VI), from a viewpoint of the consideration on the toxicity, environment and the like, a substituent containing at least one element selected from the group consisting of carbon, silicon, nitrogen, phosphorus, oxygen and sulfur is preferable, and a substituent having a structure represented by the following formula (XI), (XII) or (XIII) is more preferable.

(XI)

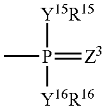

(XII)

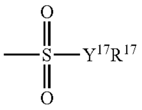

(XIII)

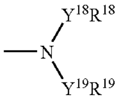

In the formulae (XI), (XII) and (XIII), $R^{15}$-$R^{19}$ are independently a monovalent substituent or a halogen element, $Y^{15}$-$Y^{19}$ are independently a bivalent connecting group, a bivalent element or a single bond, and $Z^2$ is a bivalent group or a bivalent element.

As $R^{15}$-$R^{19}$ in the formulae (XI), (XII) and (XIII) are preferably mentioned the same monovalent substituents or halogen elements as described in $R^7$-$R^9$ of the formula (VI). They may be the same kind in the same substituent, or some of them may be different kinds. $R^{15}$ and $R^{16}$ in the formula (XI), and $R^{18}$ and $R^{19}$ in the formula (XIII) may be bonded to each other to form a ring.

As the group shown by $Y^{15}$-$Y^{19}$ in the formulae (XI), (XII) and (XIII) are mentioned the same bivalent connecting groups, bivalent elements or the like as described in $Y^7$-$Y^8$ of the formula (VI). Similarly, the bivalent connecting group containing sulfur and/or oxygen, oxygen element or sulfur element is particularly preferable in a point that the safety of the electrolyte is improved. Also, the bivalent connecting group containing oxygen and oxygen element are particularly preferable in a point that the low-temperature characteristics of the electrolyte are excellent. They may be the same kind in the same substituent, or some of them may be different kinds.

As $Z^2$ in the formula (XI) are mentioned, for example, $CH_2$ group, CHR' group (R' is an alkyl group, an alkoxyl group, phenyl group or the like, and so forth), NR' group, and a bivalent group containing at least one element selected from the group consisting of oxygen, sulfur, selenium, boron, aluminum, scandium, gallium, yttrium, indium, lanthanum, thallium, carbon, silicon, titanium, tin, germanium, zirconium, lead, phosphorus, vanadium, arsenic, niobium, antimony, tantalum, bismuth, chromium, molybdenum, tellurium, polonium, tungsten, iron, cobalt and nickel. Among them, $CH_2$ group, CHR' group, NR' group and the bivalent group containing at least one element selected from the group consisting of oxygen, sulfur and selenium are preferable. Also, $Z^2$ may be a bivalent element such as oxygen, sulfur, selenium or the like. Particularly, the bivalent group containing sulfur and/or selenium, sulfur element or selenium element is preferable because the safety of the electrolyte is improved. Also, the bivalent group containing oxygen and oxygen element are particularly preferable in a point that the low-temperature characteristics of the electrolyte are excellent.

As to these substituents, in a point that the safety can be effectively improved, the substituent containing phosphorus as shown by the formula (XI) is particularly preferable. Furthermore, when $Z^2$, $Y^{15}$ and $Y^{16}$ in the formula (XI) are oxygen elements, it is possible to develop very excellent low-temperature characteristics in the electrolyte. Also, when the substituent is a sulfur-containing substituent as shown by the formula (XII), it is particularly preferable in a point that the interfacial resistance of the electrolyte is made small.

By properly selecting $R^7$-$R^9$, $R^{15}$-$R^{19}$, $Y^7$-$Y^8$, $Y^{15}$-$Y^{19}$ and $Z^2$ in the formulae (VI) and (XI)-(XIII), it is possible to prepare an electrolyte having a more preferable viscosity, a solubility suitable for the adding-mixing, and low-temperature characteristics. These compounds may be used alone or in a combination of two or more.

The isomer of the formula (VI) is an isomer of a phosphazene derivative represented by the formula (VII) and can be prepared, for example, by adjusting a vacuum degree and/or a temperature in the formation of the phosphazene derivative represented by the formula (VII). The content of the isomer in the electrolyte (volume %) can be measured by the following measuring method.

<<Measuring Method>>

It can be measured by finding a peak area of a sample through a gel permeation chromatography (GPC) or a high-speed liquid chromatography, comparing the found peak area with a previously found area per mole of the isomer to obtain a molar ratio, and further converting into a volume while considering a specific gravity.

As the phosphazene derivative of the formula (VII) is preferable ones having a relatively low viscosity and capable of well dissolving the support salt. As $R^7$-$R^9$, $Y^7$-$Y^8$ and $X^2$ of the formula (VII) are preferably mentioned the same as described in $R^7$-$R^9$, $Y^7$-$Y^8$ and $X^2$ of the formula (VI).

The phosphazene derivative represented by the formula (I), (II), (V) or (VII), or the isomer of the formula (VI) is preferable to have a substituent containing a halogen element in its molecular structure. When the molecular structure has the substituent containing the halogen element, even if the content of the phosphazene derivative or the isomer is small, it is possible to effectively reduce the risk of fire-ignition in the electrolyte by a halogen gas derived from the substituent. Moreover, the occurrence of a halogen radical may come into problem in the compound having the halogen element-containing substituent. In case of phosphazene derivative or the isomer of the phosphazene derivative, this problem is never caused because phosphorus element in the molecular structure catches the halogen radical to form a stable phosphorus halide.

The content of the halogen element in the phosphazene derivative or the isomer of the phosphazene derivative is preferably 2-80% by weight, more preferably 2-60% by weight, further preferably 2-50% by weight. When the content is less than 2% by weight, the effect by the inclusion of the halogen element may be not sufficiently developed, while when it exceeds 80% by weight, the viscosity becomes higher, and hence when it is added to the electrolyte, the electric conductivity may lower. As such a halogen element, fluorine, chlorine, bromine and the like are preferable, and particularly fluorine is preferable from a viewpoint of the provision of good battery characteristics.

The ignition point of the phosphazene derivative represented by the formulae (I), (II), (IV), (V) and (VII) is not particularly limited, but it is preferably not lower than 100° C., more preferably not lower than 150° C., further preferably not lower than 300° C. from a viewpoint of the fire control and the like. On the other hand, the phosphazene derivative of the formula (III) has no ignition point. The term "ignition point" used herein means concretely means a temperature that the flame is widened on a surface of a mass to cover at least 75% of the mass surface. The ignition point is a measure observing a tendency of forming a combustible mixture with air. When the phosphazene derivative has an ignition point above 100° C. or has not an ignition point, the fire or the like is suppressed, and also even if the fire or the like is caused in the interior of the battery, it is possible to lower the risk that it is ignited to outblaze on the surface of the electrolyte.

As the phosphazene derivative of the formula (III) or (V), or the isomer of the formula (VI) and the phosphazene derivative of the formula (VII) are added, the decomposition of the support salt is suppressed to considerably stabilize the electrolyte. In the conventional electrolyte comprising an ester based organic solvent used in the non-aqueous electrolyte battery and a support salt as a lithium ion source, the support salt is decomposed with the lapse of time and the decomposed mass reacts with a slight amount of water or the like existing in the organic solvent, whereby there may be caused a case that the electric conduction of the electrolyte lowers or the electrode material is deteriorated. On the contrary, the phosphazene derivative or the isomer of the phosphazene derivative is added to the conventional electrolyte, the decomposition of the support salt is suppressed and the stability of the electrolyte is considerably improved. In genera, $LiBF_4$, $LiPF_6$, $LiCF_3SO_3$, $Li(C_3F_5SO_2)_2N$, $Li(CF_3SO_2)_2N$ and the like are used as the support salt for the non-aqueous electrolyte primary battery. Particularly, $LiCF_3SO_3$, $Li(C_3F_5SO_2)_2N$ and $Li(CF_3SO_2)_2N$ are preferable because the hydrolysis of the support salt itself is low, but $LiBF_4$ and $LiPF_6$ can be preferably used owing to the above action of phosphazene.

The contents of the phosphazene derivative and the isomer of the phosphazene derivative in the electrolyte are described below. From a viewpoint of "limit oxygen index", the content of the phosphazene derivative of the formula (I) or (II) to the electrolyte is preferably not less than 5 volume %, more preferably 10-50 volume %. By adjusting the content to the value of the above range is effectively reduced the risk of fire-ignition of the electrolyte. Moreover, the above range effectively reduces the risk of ignition but differs in accordance with the kind of the support salt and the kind of electrolyte used, so that it is optimized by properly determining the content so that the system used is controlled to a lowest viscosity and the limit oxygen index is rendered into not less than 21 volume %.

From a viewpoint of "safety", the content of the phosphazene derivative of the formula (III) in the electrolyte is preferably not less than 5 volume %, and the content of the phosphazene derivative of the formula (IV) is preferably not less than 10 volume %, more preferably not less than 15 volume %, and the content of the phosphazene derivative of the formula (V) is preferably not less than 20 volume %, more preferably not less than 30 volume %, and the total content of the isomer of the formula (VI) and the phosphazene derivative of the formula (VII) is preferably not less than 20 volume %, more preferably not less than 30 volume %. When the content is within the above range, the safety of the electrolyte can be preferably improved.

From a viewpoint of "low-temperature characteristics", the content of the phosphazene derivative of the formula (III) in the electrolyte is preferably not less than 1 volume %, more preferably not less than 3 volume %, further preferably not less than 5 volume %, and the total content of the isomer of the formula (VI) and the phosphazene derivative of the formula (VII) not less that 1 volume %, more preferably not less than 2 volume %, further preferably not less than 5 volume %. When the content is less than 1 volume %, the low-temperature characteristics of the electrolyte are not sufficient.

From a viewpoint of "deterioration resistance", the content of the phosphazene derivative of the formula (III) is preferably not less than 2 volume %, more preferably 3-75 volume %, and the content of the phosphazene derivative of the formula (IV) is preferably not less than 2 volume %, more preferably 2-75 volume %, and the content of the phosphazene derivative of the formula (V) is preferably not less than 2% by weight, more preferably 2-20% by weight, and the total content of the isomer of the formula (VI) and the phosphazene derivative of the formula (VII) is preferably not less than 2 volume %, more preferably 3-75 volume %. When the content is within the above range, the deterioration of the electrolyte can be preferably suppressed.

From a viewpoint of "lowering of viscosity", the content of the phosphazene derivative of the formula (III) in the electrolyte is preferably not less than 3 volume %, more preferably 3-80 volume %. When the content is less than 3 volume %, the viscosity of the electrolyte can not be made sufficiently low.

From a viewpoint of "control of viscosity rise", the content of the phosphazene derivative of the formula (V) in the electrolyte is preferably not more than 40% by weight, more preferably not more than 35% by weight, further preferably not more than 30% by weight. When the content exceeds 40% by weight, the viscosity rise of the electrolyte becomes remarkably large and the internal resistance is high and the electric conductivity becomes undesirably low.

From a viewpoint of "safety" in the primary battery, a case of including the cyclic phosphazene derivative of the formula (IV) or (V), or the isomer of the formula (VI) and the phosphazene derivative of the formula (VII) and $LiBF_4$ or $LiCF_3SO_3$, and γ-butyrolactone and/or propylene carbonate is particularly preferable as the electrolyte. In this case, even if the content is small, the safety is very high irrespectively of the aforementioned description. That is, the content of the cyclic phosphazene derivative of the formula (IV) in the electrolyte is preferably not less than 5 volume % in order to develop the excellent safety. Also, the content of the cyclic phosphazene derivative of the formula (V) in the electrolyte is preferably 5-10% by weight, further preferably more than 10% by weight in case of including $LiBF_4$ in order to develop the excellent safety, and preferably 5-25% by weight, further preferably more than 25% by weight in case of including $LiCF_3SO_3$ in order to develop the excellent safety. Furthermore, the total content of the isomer of the formula (VI) and the phosphazene derivative of the formula (VII) in the electrolyte is preferably 1.5-10 volume %, further preferably more than 10 volume % in case of including $LiBF_4$ in order to develop the excellent safety, and preferably 2.5-15 volume %, further preferably more than 15 volume % in case of including $LiCF_3SO_3$ in order to develop the excellent safety. Moreover, if it is intended to use at a high temperature, a case of including $Li(C_2F_5SO_2)_2N$, $Li(CF_3SO_2)_2N$ and $LiBF_4$ as a support salt is also preferable.

On the other hand, from a viewpoint of "safety" in the secondary battery, a case of including the cyclic phosphazene derivative of the formula (IV) or (V) or the isomer of the formula (VI) and the phosphazene derivative of the formula (VII) and $LiPF_6$ and ethylene carbonate and/or propylene carbonate, or a case of including the cyclic phosphazene derivative of the formula (IV) or (V) or the isomer of the formula (VI) and the phosphazene derivative of the formula (VII) and $LiCF_3SO_3$ and propylene carbonate is particularly preferable as the electrolyte. In this case, even if the content is small, the safety is very high irrespectively of the aforementioned description. That is, the content of the cyclic phosphazene derivative of the formula (IV) in the electrolyte is preferably not less than 5 volume % in order to develop the excellent safety. Also, the content of the cyclic phosphazene derivative of the formula (V) in the electrolyte is preferably 2-5% by weight, further preferably more than 5% by weight in order to develop the excellent safety. Furthermore, the total content of the isomer of the formula (VI) and the phosphazene derivative of the formula (VII) in the electrolyte is preferably 1.5-2.5 volume %, further preferably more than 2.5 volume % in order to develop the excellent safety.

-Other Members-

As the other member used in the non-aqueous electrolyte battery according to the invention is mentioned a separator interposed between positive and negative electrodes in the non-aqueous electrolyte battery for preventing the short-circuiting of current due to the contact of both electrodes. As a material of the separator are preferably mentioned materials capable of surely preventing the contact of both electrodes and passing or impregnating the electrolyte, for example, non-woven fabric, thin-layer film and the like of a synthetic resin such as polytetrafluoroethylene, polypropylene, polyethylene, cellulose-based resin, polybutylene terephthalate, polyethylene terephthalate or the like. Among them, microporous film of polypropylene or polyethylene having a thickness of about 20-50 μm and a film of cellulose-based resin, polybutylene terephthalate, polyethylene terephthalate or the like are particularly preferable.

In the invention, well-known members usually used in the battery can be preferably used in addition to the separator.

-Form of Non-aqueous Electrolyte Battery-

The form of the aforementioned non-aqueous electrolyte battery according to the invention is not particularly limited, and preferably includes various known forms such as coin type, button type, paper type, cylindrical cells of rectangular or spiral structure and the like. In case of button type, a non-aqueous electrolyte battery can be prepared by providing sheet-shaped positive electrode and negative electrode, and sandwiching a separator between the positive and negative electrodes and the like. In case of spiral structure, a non-aqueous electrolyte battery can be prepared by providing sheet-shaped positive electrodes, sandwiching a collector therebetween, piling a negative electrode (sheet-shaped) thereon and winding them and the like.

The following examples are given in illustration of the invention and are not intended as limitations thereof.

<Non-aqueous Electrolyte Primary Battery>

A positive electrode for a lithium primary battery is prepared by the following method. At first, 10 g of an aqueous solution of 3% by mass of calcium hydroxide is added to 10 g of manganese dioxide (EMD, made by Mitsui Mining Co., Ltd.) while cooling with ice, which are mixed with stirring to prepare a mixed solution. Then, the temperature of the mixed solution is raised to 50° C. at a rate of 5° C./min to reduce a water content in the mixed solution. Subsequently, the temperature of the mixed solution is raised to 80° C. at a rate of 10° C./min to substantially remove the water content in the mixed solution to obtain a mixture of manganese dioxide and calcium hydroxide. Next, the temperature of this mixture is raised to 300° C. and held at this temperature for about 3 hours to convert calcium hydroxide into calcium oxide, and thereafter dropped to room temperature by air cooling to obtain powder for positive electrode dispersing calcium oxide between particles of manganese dioxide. Moreover, the mass of calcium oxide in the powder for positive electrode is 2.3% per the mass of manganese dioxide.

The powder for positive electrode is mixed and kneaded with acetylene black and polytetrafluoroethylene (PTFE) at a ratio of 8:1:1 (by mass) and the resulting kneaded mass is applied through a doctor blade and dried by hot air (100-120° C.) and punched out by a punching machine of 16 mmϕ to prepare a positive electrode for a lithium primary battery. Moreover, the mass of the positive electrode is 20 mg.

This positive electrode is used to prepare a lithium primary battery as follows. Moreover, a lithium foil punched out into 16 mmϕ (thickness: 0.5 mm) is used in a negative electrode, and a nickel foil is used in a collector. Also, an electrolyte is prepared by dissolving $LiBF_4$ in γ-butyrolactone (GBL) at a concentration of 0.75 mol/L. As a separator is used a cellulose separator (TF4030, made by Nippon Kodo Kami Kogyo Co., Ltd.), through which the positive and negative electrodes are opposed to each other, and the electrolyte is poured and sealed to prepare a lithium primary battery of CR2016 type.

As the battery is discharged to 1.5 V (lower limit voltage) at a constant current of 1 mA (0.2 C) in ambient atmosphere of 25° C., a discharge capacity at room temperature is measured to be 275 mAh/g.

Also, a battery prepared in the same manner as mentioned above is stored at 120° C. for 60 hours and then a discharge capacity at room temperature after the storing is measured under the same conditions as mentioned above to be 200 mAh/g.

Further, a limit oxygen index of the above electrolyte is 19.1 volume % as measured according to JIS K7201.

CONVENTIONAL EXAMPLE 1

A lithium primary battery is prepared by mixing and kneading manganese dioxide (EMD, made by Mitsui Mining Co., Ltd.) with acetylene black and polytetrafluoroethylene (PTFE) at a ratio of 8:1:1 (by mass) in the same manner as in Example 1 except that calcium oxide in not dispersed between the particles of manganese dioxide, and then the discharge capacity is measured in the same manner as mentioned above. As a result, the discharge capacity at room temperature just after the preparation is 250 mAh/g, and the discharge capacity at room temperature after the storing at 120° C. for 60 hours is 151 mAh/g.

EXAMPLES 2-3 AND COMPARATIVE EXAMPLES 1-2

A powder for positive electrode is prepared in the same manner as in Example 1 except that an amount of calcium oxide dispersing between the particles of manganese dioxide is changed as shown in Table 1, and then a lithium primary battery is prepared. With respect to the thus obtained lithium primary batteries, the discharge capacity is measured in the same manner as in Example 1. The results are shown in Table 1.

TABLE 1

| | unit | Example 1 | Example 2 | Example 3 | Comparative Example 1 | Comparative Example 2 |
|---|---|---|---|---|---|---|
| Amount of calcium oxide | % by mass | 2.3 | 0.5 | 4 | 0.3 | 5 |
| Discharge capacity just after preparation | mAh/g | 275 | 278 | 277 | 253 | 255 |
| Discharge capacity after the storing at high temperature *1 | mAh/g | 200 | 205 | 213 | 170 | 185 |

*1: storing at 120° C. for 60 hours

EXAMPLES 4-5

A powder for positive electrode is prepared in the same manner as in Example 1 except that magnesium oxide or barium oxide is dispersed between the particles of manganese dioxide instead of calcium oxide (mass of each alkaline earth metal oxide per mass of manganese dioxide is 2.3%), and then a lithium primary battery is prepared. With respect to the thus obtained lithium primary batteries, the discharge capacity is measured in the same manner as in Example 1. The results are shown in Table 2.

TABLE 2

| | Example 1 | Example 4 | Example 5 |
|---|---|---|---|
| Kind of alkaline earth metal oxide | CaO | MgO | BaO |
| Discharge capacity just after preparation (mAh/g) | 275 | 272 | 271 |
| Discharge capacity after the storing at high temperature (mAh/g)*1 | 200 | 195 | 199 |

*1: storing at 120° C. for 60 hours

EXAMPLE 6

A lithium primary battery is prepared in the same manner as in Example 1 except that the electrolyte is prepared by dissolving $LiBF_4$ (lithium salt) at a concentration of 0.75 mol/L (M) in a mixed solution of 10 volume % of a phosphazene derivative A (a cyclic phosphazene derivative compound of the formula (IV) in which n is 3 and two of six $R^5$s are ethoxy group and remaining four thereof are fluorine, viscosity at 25° C.: 1.2 mPa·s (1.2 cP)) and 90 volume % of γ-butyrolactone (GBL), and then the discharge capacity is measured in the same manner as mentioned above. As a result, the discharge capacity just after the preparation is 280 mAh/g, and the discharge capacity after the storing at 120° C. for 60 hours is 220 mAh/g. Also, the limit oxygen index of the electrolyte is 24.2 volume % as measured in the same manner as in Example 1.

EXAMPLE 7

An electrolyte is prepared in the same manner as in Example 6 except that a phosphazene derivative B (a cyclic phosphazene derivative compound of the formula (IV) in which n is 3 and one of six $R^5$s is ethoxy group and remaining five thereof are fluorine, viscosity at 25° C.: 1.2 mPa·s (1.2 cP)) is used instead of the phosphazene derivative A, and a lithium primary battery is prepared, and then the discharge capacity and the limit oxygen index are measured in the same manner as mentioned above. The results are shown in Table 3.

EXAMPLE 8

An electrolyte is prepared in the same manner as in Example 6 except that a phosphazene derivative C (a cyclic phosphazene derivative compound of the formula (IV) in which n is 4 and one of eight $R^5$s is ethoxy group and remaining seven thereof are fluorine, viscosity at 25° C.: 1.3 mPa·s (1.3 cP)) is used instead of the phosphazene derivative A, and a lithium primary battery is prepared, and then the discharge capacity and the limit oxygen index are measured in the same manner as mentioned above. The results are shown in Table 3.

EXAMPLE 9

An electrolyte is prepared in the same manner as in Example 6 except that a phosphazene derivative D (a cyclic phosphazene derivative compound of the formula (IV) in which n is 3 and one of six $R^5$s is $OCH_2CF_3$ and remaining five thereof are fluorine, viscosity at 25° C.: 1.8 mPa·s (1.8 cP)) is used instead of the phosphazene derivative A, and a lithium primary battery is prepared, and then the discharge capacity and the limit oxygen index are measured in the same manner as mentioned above. The results are shown in Table 3.

by adding the phosphazene derivative to prepare the electrolyte in addition to the dispersion of the alkaline earth metal oxide between the particles of manganese dioxide.

<Non-aqueous Electrolyte Secondary Battery>

EXAMPLE 10

A positive electrode for a non-aqueous electrolyte secondary battery is prepared by the following method. At first, 10 g of an aqueous solution of 3% by mass of calcium hydroxide is added to 10 g of $LiCoO_2$ (made by Nihon Kagaku Kogyo Co., Ltd.) while cooling with ice, which are mixed with stirring to prepare a mixed solution. Then, the temperature of the mixed solution is raised to 50° C. at a rate of 5° C./min to reduce a water content in the mixed solution. Subsequently, the temperature of the mixed solution is raised to 80° C. at a rate of 10° C./min to substantially remove the water content in the mixed solution to obtain a mixture of $LiCoO_2$ and calcium hydroxide. Next, the temperature of this mixture is raised to 300° C. and held at this temperature for about 3 hours to convert calcium hydroxide into calcium oxide, and thereafter dropped to room temperature by air cooling to obtain powder for positive electrode dispersing calcium oxide between particles of $LiCoO_2$. Moreover, the mass of calcium oxide in the powder for positive electrode is 2.3% per the mass of $LiCoO_2$.

To 100 parts by mass of the powder for positive electrode are added 10 parts by mass of acetylene black and 10 parts by mass of polytetrafluoroeythylene (PTFE) and kneaded with

TABLE 3

| | Example 1 | Example 6 | Example 7 | Example 8 | Example 9 |
|---|---|---|---|---|---|
| Kind of phosphazene | — | phosphazene A | phosphazene B | phosphazene C | phosphazene D |
| Discharge capacity just after preparation (mAh/g) | 275 | 280 | 280 | 280 | 277 |
| Discharge capacity after the storing at high temperature (mAh/g) *1 | 200 | 220 | 203 | 209 | 230 |
| Limit oxygen index (volume %) | 19.1 | 23.7 | 24.2 | 25.1 | 23.9 |

*1: storing at 120° C. for 60 hours

As seen from these results, the discharge capacity at room temperature just after the preparation and the discharge capacity at room temperature after the storing at the high temperature are improved by dispersing the alkaline earth metal oxide between the particles of manganese dioxide. Also, it has been found that the discharge capacity at room temperature just after the preparation and the discharge capacity at room temperature after the storing at the high temperature are further improved and the limit oxygen index of the electrolyte is raised to improve the safety of the battery an organic solvent (mixed solvent of 50/50 volume % of ethyl acetate and ethanol), which is subjected to a rolling through rollers to prepare a thin-layered positive electrode sheet having a thickness of 100 μm and a width of 40 mm. Thereafter, the two positive electrode sheets are used, and an aluminum foil of 25 μm in thickness (collector) coated on its surface with an electrically conductive adhesive is interposed therebetween, and a lithium metal foil of 150 μm in thickness is piled thereon through a separator of 25 μm in thickness (mi croporous film made of polypropylene), which are wound up to prepare a cylinder type battery. The length of the positive electrode in the cylinder type battery is about 260 mm.

An electrolyte is prepared by dissolving LiBF4 (support salt) at a concentration of 1 mol/kg in a mixed solution of 50 volume % of diethyl carbonate and 50 volume % of ethylene carbonate. The electrolyte is poured in the cylinder type battery and sealed to prepare a size AA lithium battery.

This battery is subjected to recharging-discharging of 50 cycles in an ambient atmosphere of 25° C. under conditions of upper limit voltage: 4.5 V, lower limit voltage: 3.0 V, discharge current: 100 mA and recharge current: 50 mA. As a result, the recharge-discharge capacity at initial stage is 145 mAh/g, and the recharge-discharge capacity after 50 cycles is 143 mAh/g.

Also, a battery prepared in the same manner as mentioned above is stored at 70° C. for 60 hours, and the recharge-discharge capacity after the storing is measured in the same manner as mentioned above. As a result, the recharge-discharge capacity at initial stage is 142 mAh/g, and the recharge-discharge capacity after 50 cycles is 140 mAh/g.

Furthermore, the limit oxygen index of the electrolyte is 17.1 volume % as measured according to JIS K7201.

CONVENTIONAL EXAMPLE 2

A size AA lithium battery is prepared in the same manner as in Example 10 except that a thin-layered positive electrode sheet is prepared by adding 10 parts by mass of acetylene black and 10 parts by mass of polytetrafluoroethylene (PTFE) to 100 parts by mass of $LiCoO_2$, kneading with an organic solvent (mixed solvent of 50/50 volume % of ethyl acetate and ethanol) and subjecting to a rolling through rollers, and then the recharge-discharge capacity is measured in the same manner as mentioned above. As a result, the initial recharge-discharge capacity just after the preparation is 141 mAh/g and the recharge-discharge capacity after 50 cycles is 130 mAh/g. Also, the initial recharge-discharge capacity after the storing at 70° C. for 60 hours is 133 mAh/g and the recharge-discharge capacity after 50 cycles is 116 mAh/g.

EXAMPLES 11-12 AND COMPARATIVE EXAMPLES 3-4

A lithium secondary battery is prepared by preparing powder for positive electrode in the same manner as in Example 10 except that an amount of calcium oxide dispersing between particles of $LiCoO_2$ is changed as shown in Table 4. With respect to the thus obtained batteries, the recharge-discharge capacity is measured in the same manner as in Example 10. The results are shown in Table 4.

TABLE 4

| | | Example 10 | Example 11 | Example 12 | Comparative Example 3 | Comparative Example 4 |
|---|---|---|---|---|---|---|
| Amount of calcium oxide (% by mass) | | 2.3 | 0.5 | 4 | 0.3 | 5 |
| Just after preparation | Initial recharge-discharge capacity (mAh/g) | 145 | 145 | 144 | 144 | 141 |
| | Recharge-discharge capacity after 50 cycles (mAh/g) | 143 | 144 | 143 | 142 | 132 |
| After storing at high temperature *2 | Initial recharge-discharge capacity (mAh/g) | 142 | 142 | 142 | 133 | 140 |
| | Recharge-discharge capacity after 50 cycles (mAh/g) | 140 | 141 | 142 | 110 | 130 |

*2: storing at 70° C. for 60 hours

EXAMPLE 13

A lithium secondary battery is prepared by preparing powder for positive electrode in the same manner as in Example 10 except that $LiMn_2O_4$ (Type E09Z, made by Nikki Kagaku Co., Ltd.) is used instead of $LiCoO_2$ as an active substance for positive electrode. With respect to the thus obtained battery, the recharge-discharge capacity is measured in the same manner as in Example 10. The results are shown in Table 5.

EXAMPLES 14-15 AND COMPARATIVE EXAMPLES 5-6

A lithium secondary battery is prepared by preparing powder for positive electrode in the same manner as in Example 10 except that an amount of calcium oxide dispersing between particles of $LiMn_2O_4$ is changed as shown in Table 4. With respect to the thus obtained batteries, the recharge-discharge capacity is measured in the same manner as in Example 10. The results are shown in Table 5.

TABLE 5

| | | Example 13 | Example 14 | Example 15 | Comparative Example 5 | Comparative Example 6 |
|---|---|---|---|---|---|---|
| Amount of calcium oxide (% by mass) | | 2.3 | 0.5 | 4 | 0.3 | 5 |
| Just after preparation | Initial recharge-discharge capacity (mAh/g) | 104 | 104 | 104 | 104 | 98 |
| | Recharge-discharge capacity after 50 cycles (mAh/g) | 102 | 103 | 103 | 103 | 77 |
| After storing at high temperature *2 | Initial recharge-discharge capacity (mAh/g) | 100 | 101 | 101 | 101 | 94 |
| | Recharge-discharge capacity after 50 cycles (mAh/g) | 94 | 95 | 94 | 95 | 59 |

*2: storing at 70° C. for 60 hours

EXAMPLE 16

To an aqueous solution of nickel nitrate ($Ni(NO_3)_2$) is added an aqueous solution of 1 M (mol/L) of ammonia ($NH_3$) to precipitate nickel hydroxide through a sol-gel method. After the filtration, the precipitates are dried at 80° C. in air for 12 hours. Thereafter, it is added and sufficiently mixed with lithium hydroxide (LiOH) and fired at 950° C. in an oxygen atmosphere for 12 hours to prepare $LiNiO_2$.

A lithium secondary battery is prepared by preparing powder for positive electrode in the same manner as in Example 10 except that the above prepared $LiNiO_2$ is used instead of $LiCoO_2$ as an active substance for positive electrode. With respect to the thus obtained battery, the recharge-discharge capacity is measured in the same manner as in Example 10. The results are shown in Table 6.

EXAMPLES 17-18 AND COMPARATIVE EXAMPLES 7-8

A lithium secondary battery is prepared by preparing powder for positive electrode in the same manner as in Example 10 except that an amount of calcium oxide dispersing between particles of $LiNiO_2$ is changed as shown in Table 6. With respect to the thus obtained batteries, the recharge-discharge capacity is measured in the same manner as in Example 10. The results are shown in Table 6.

TABLE 6

| | | Example 16 | Example 17 | Example 18 | Comparative Example 7 | Comparative Example 8 |
|---|---|---|---|---|---|---|
| Amount of calcium oxide (% by mass) | | 2.3 | 0.5 | 4 | 0.3 | 5 |
| Just after preparation | Initial recharge-discharge capacity (mAh/g) | 158 | 158 | 158 | 158 | 158 |
| | Recharge-discharge capacity after 50 cycles (mAh/g) | 156 | 156 | 155 | 156 | 142 |
| After storing at high temperature *2 | Initial recharge-discharge capacity (mAh/g) | 153 | 154 | 152 | 154 | 150 |
| | Recharge-discharge capacity after 50 cycles (mAh/g) | 150 | 150 | 150 | 151 | 122 |

*2: storing at 70° C. for 60 hours

EXAMPLES 19-20

A powder for positive electrode is prepared in the same manner as in Example 10 except that magnesium oxide or barium oxide is dispersed between the particles of $LiCoO_2$ instead of calcium oxide (mass of each alkaline earth metal oxide per mass of $LiCoO_2$ is 2.3%), and then a lithium secondary battery is prepared. With respect to the thus obtained batteries, the recharge-discharge capacity is measured in the same manner as in Example 10. The results are shown in Table 7.

TABLE 7

| | | Example 10 | Example 11 | Example 12 |
|---|---|---|---|---|
| Kind of alkaline earth metal oxide | | CaO | MgO | BaO |
| Just after preparation | Initial recharge-discharge capacity (mAh/g) | 145 | 144 | 145 |
| | Recharge-discharge capacity after 50 cycles (mAh/g) | 143 | 142 | 140 |
| After storing at high temperature*2 | Initial recharge-discharge capacity (mAh/g) | 142 | 141 | 140 |
| | Recharge-discharge capacity after 50 cycles (mAh/g) | 140 | 140 | 139 |

*2: storing at 70° C. for 60 hours

EXAMPLES 21-22

A powder for positive electrode is prepared in the same manner as in Example 13 except that magnesium oxide or barium oxide is dispersed between the particles of $LiMn_2O_4$ instead of calcium oxide (mass of each alkaline earth metal oxide per mass of $LiMn_2O_4$ is 2.3%), and then a lithium secondary battery is prepared. With respect to the thus obtained batteries, the recharge-discharge capacity is measured in the same manner as in Example 10. The results are shown in Table 8.

TABLE 8

| | | Example 13 | Example 21 | Example 22 |
|---|---|---|---|---|
| Kind of alkaline earth metal oxide | | CaO | MgO | BaO |
| Just after preparation | Initial recharge-discharge capacity (mAh/g) | 104 | 103 | 102 |
| | Recharge-discharge capacity after 50 cycles (mAh/g) | 102 | 101 | 99 |
| After storing at high temperature*2 | Initial recharge-discharge capacity (mAh/g) | 100 | 100 | 98 |
| | Recharge-discharge capacity after 50 cycles (mAh/g) | 94 | 95 | 94 |

*2: storing at 70° C. for 60 hours

EXAMPLES 23-24

A powder for positive electrode is prepared in the same manner as in Example 16 except that magnesium oxide or barium oxide is dispersed between the particles of $LiNiO_2$ instead of calcium oxide (mass of each alkaline earth metal oxide per mass of $LiNiO_2$ is 2.3%), and then a lithium secondary battery is prepared. With respect to the thus obtained batteries, the recharge-discharge capacity is measured in the same manner as in Example 10. The results are shown in Table 9.

TABLE 9

| | | Example 16 | Example 23 | Example 24 |
|---|---|---|---|---|
| Kind of alkaline earth metal oxide | | CaO | MgO | BaO |
| Just after preparation | Initial recharge-discharge capacity (mAh/g) | 158 | 154 | 154 |
| | Recharge-discharge capacity after 50 cycles (mAh/g) | 156 | 150 | 151 |

TABLE 9-continued

|  |  | Example 16 | Example 23 | Example 24 |
|---|---|---|---|---|
| After storing at high temperature*2 | Initial recharge-discharge capacity (mAh/g) | 153 | 150 | 150 |
|  | Recharge-discharge capacity after 50 cycles (mAh/g) | 150 | 148 | 147 |

*2: storing at 70° C. for 60 hours

EXAMPLE 25

A size AA lithium secondary battery is prepared in the same manner as in Example 10 except that an electrolyte is prepared by dissolving LiBF$_4$ (lithium salt) at a concentration of 1 mol/kg in a mixed solution of 10 volume % of a phosphazene derivative A (a cyclic phosphazene derivative of the formula (IV) in which n is 3 and two of six $R^5$s are ethoxy group and the remaining four thereof are fluorine, viscosity at 25° C.: 1.2 mPa·s (1.2 cP)), 45 volume % of diethyl carbonate and 45 volume % of ethylene carbonate, and then the recharge-discharge capacity is measured in the same manner as described above. As a result, the recharge-discharge capacity just after the preparation is 146 mAh/g, and the recharge-discharge capacity after 50 cycles is 144 mAh/g. Also, the initial recharge-discharge capacity after the storing at 70° C. for 60 hours is 142 mAh/g, and the recharge-discharge capacity after 50 cycles is 140 mAh/g. On the other hand, the limit oxygen index of the electrolyte is 22.9 volume % as measured in the same manner as in Example 10.

EXAMPLE 26

An electrolyte is prepared in the same manner as in Example 25 except that a phosphazene derivative B (a cyclic phosphazene derivative compound of the formula (IV) in which n is 3 and one of six $R^5$s is ethoxy group and remaining five thereof are fluorine, viscosity at 25° C.: 1.2 mPa·s (1.2 cP)) is used instead of the phosphazene derivative A, and a non-aqueous electrolyte secondary battery is prepared, and then the recharge-discharge capacity and the limit oxygen index are measured in the same manner as mentioned above. The results are shown in Table 10.

EXAMPLE 27

An electrolyte is prepared in the same manner as in Example 25 except that a phosphazene derivative C (a cyclic phosphazene derivative compound of the formula (IV) in which n is 4 and one of eight $R^5$s is ethoxy group and remaining seven thereof are fluorine, viscosity at 25° C.: 1.3 mPa·s (1.3 cP)) is used instead of the phosphazene derivative A, and a non-aqueous electrolyte secondary battery is prepared, and then the recharge-discharge capacity and the limit oxygen index are measured in the same manner as mentioned above. The results are shown in Table 10.

EXAMPLE 28

An electrolyte is prepared in the same manner as in Example 25 except that a phosphazene derivative D (a cyclic phosphazene derivative compound of the formula (IV) in which n is 3 and one of six $R^5$s is OCH$_2$CF$_3$ and remaining five thereof are fluorine, viscosity at 25° C.: 1.8 mPa·s (1.8 cP)) is used instead of the phosphazene derivative A, and a non-aqueous electrolyte secondary battery is prepared, and then the recharge-discharge capacity and the limit oxygen index are measured in the same manner as mentioned above. The results are shown in Table 10.

TABLE 10

|  |  | Example 10 | Example 25 | Example 26 | Example 27 | Example 28 |
|---|---|---|---|---|---|---|
| Kind of phosphazene |  | — | phosphazene A | phosphazene B | phosphazene C | phosphazene D |
| Just after preparation | Initial recharge-discharge capacity (mAh/g) | 145 | 146 | 147 | 147 | 145 |
|  | Recharge-discharge capacity after 50 cycles (mAh/g) | 143 | 144 | 144 | 145 | 142 |
| After storing at high temperature *2 | Initial recharge-discharge capacity (mAh/g) | 142 | 142 | 142 | 144 | 144 |
|  | Recharge-discharge capacity after 50 cycles (mAh/g) | 140 | 140 | 139 | 141 | 142 |
| Limit oxygen index (volume %) |  | 17.1 | 22.9 | 23.8 | 24.3 | 23.9 |

*2: storing at 70° C. for 60 hours

As seen from these results, the recharge-discharge capacities and cycle properties just after the preparation and after the storing at the high temperature are improved by dispersing the alkaline earth metal oxide between the particles of the lithium-containing composite oxide. Also, it has been found that the recharge-discharge capacities and cycle properties just after the preparation and after the storing at the high temperature are further improved and the limit oxygen index of the electrolyte is raised to improve the safety of the battery by adding the phosphazene derivative to prepare the electrolyte in addition to the dispersion of the alkaline earth metal oxide between the particles of the lithium-containing composite oxide. Moreover, similar results are obtained even when each of $LiNiO_2$ and $LiMn_2O_4$ is used instead of $LiCoO_2$ as an active substance for positive electrode.

INDUSTRIAL APPLICABILITY

According to the invention, there can be provided a non-aqueous electrolyte primary battery having a high discharge capacity and excellent high-temperature characteristics by using a positive electrode made from powder obtained by dispersing an alkaline earth metal oxide between particles of manganese dioxide to constitute the non-aqueous electrolyte primary battery. Also, there can be provided a non-aqueous electrolyte primary battery having a considerably high discharge capacity and more excellent high-temperature characteristics and further a high safety by using a positive electrode made from powder obtained by dispersing an alkaline earth metal oxide between particles of manganese dioxide and an electrolyte added with a phosphazene derivative and/or an isomer of a phosphazene derivative to constitute the non-aqueous electrolyte primary battery.

Also, according to the invention, there can be provided a non-aqueous electrolyte secondary battery having a high recharge-discharge capacity and excellent high-temperature characteristics by using a positive electrode made from powder obtained by dispersing an alkaline earth metal oxide between particles of lithium-containing composite oxide to constitute the non-aqueous electrolyte secondary battery. Furthermore, there can be provided a non-aqueous electrolyte secondary battery having a considerably high recharge-discharge capacity and more excellent high-temperature characteristics and further a high safety by using a positive electrode made from powder obtained by dispersing an alkaline earth metal oxide between particles of lithium-containing composite oxide and an electrolyte added with a phosphazene derivative and/or an isomer of a phosphazene derivative to constitute the non-aqueous electrolyte secondary battery.

The invention claimed is:

1. A method of producing a positive electrode for a non-aqueous electrolyte primary battery, which comprises the steps of:

(I) a step of adding an aqueous solution of at least one alkaline earth metal hydroxide selected from the group consisting of an aqueous solution of magnesium hydroxide, an aqueous solution of calcium hydroxide and an aqueous solution of barium hydroxide to manganese dioxide while cooling below 15° C. and then mixing them with stirring to prepare a mixed solution;

(II) a step of raising a temperature of the mixed solution to 45-55° C. at a rate of 1-10° C./min to reduce a water content of the mixed solution and further to 65-85° C. at a rate of 10-15° C./min to remove the water content of the mixed solution to thereby form a mixture of manganese dioxide and alkaline earth metal hydroxide;

(III) a step of raising a temperature of the mixture to 290-310° C. and holding at this temperature for a given time to convert the alkaline earth metal hydroxide into an alkaline earth metal oxide to thereby prepare powder for a positive electrode dispersing the alkaline earth metal oxide between particles of manganese dioxide; and (IV) a step of shaping the powder for a positive electrode to produce a positive electrode.

2. A method of producing a positive electrode for a non-aqueous electrolyte primary battery according to claim 1, wherein the aqueous solution of the alkaline earth metal hydroxide is an aqueous solution of calcium hydroxide.

3. A non-aqueous electrolyte primary battery comprising a positive electrode, a negative electrode and an electrolyte, wherein the positive electrode comprises at least one alkaline earth metal oxide selected from the group consisting of magnesium oxide, calcium oxide and barium oxide dispersed between particles of manganese oxide;

the electrolyte comprises an aprotic organic solvent and a salt;

the aprotic solvent is added with a phosphazene derivative; and the phosphazene derivative is a solid at 25° C. and is represented by the following formula (V):

$$(NPR^6{}_2)_n \tag{V}$$

(wherein $R^6$ is a monovalent substituent or a halogen element, and n is 3-6).

4. A non-aqueous electrolyte secondary battery comprising a positive electrode, a negative electrode and an electrolyte, wherein the positive electrode comprises at least one alkaline earth metal oxide selected from the group consisting of magnesium oxide, calcium oxide and barium oxide dispersed between particles of at least one lithium-containing composite oxide selected from the group consisting of $LiCoO_2$, $LiNiO_2$ and $LiMn_2O_4$.

5. A non-aqueous electrolyte secondary battery according to claim 4, wherein the alkaline earth metal oxide is calcium oxide.

6. A non-aqueous electrolyte secondary battery according to claim 4, wherein a mass of the alkaline earth metal oxide is 0.5-4% based on a mass of the lithium-containing composite oxide.

7. A non-aqueous electrolyte secondary battery according to claim 4, wherein the alkaline earth metal oxide has a particle size of 10-80 nm.

8. A non-aqueous electrolyte secondary battery according to claim 4, wherein the electrolyte comprises an aprotic organic solvent and a support salt.

9. A non-aqueous electrolyte secondary battery according to claim 8, wherein the aprotic organic solvent is added with a phosphazene derivative and/or an isomer of a phosphazene derivative.

10. A non-aqueous electrolyte secondary battery according to claim 9, wherein the phosphazene derivative has a viscosity at 25° C. of not more than 300 mPa·s (300 cP) and is represented by the following formula (I) or (II):

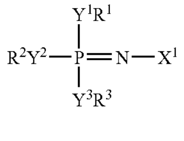

(I)

(wherein $R^1$, $R^2$ and $R^3$ are independently a monovalent substituent or a halogen element, $X^1$ is a substituent containing at least one element selected from the group consisting of carbon, silicon, germanium, tin, nitrogen, phosphorus, arsenic, antimony, bismuth, oxygen, sulfur, selenium, tellurium and polonium, and $Y^1$, $Y^2$ and $Y^3$ are independently a bivalent connecting group, a bivalent element or a single bond), or $$(NPR^4{}_2)_n \tag{II}$$

(wherein $R^4$ is a monovalent substituent or a halogen element, and n is 3-15).

11. A non-aqueous electrolyte secondary battery according to claim 10, wherein the phosphazene derivative of the formula (II) is represented by the following formula (III):

$$(NPF_2)_n \qquad (III)$$

(wherein n is 3-13).

12. A non-aqueous electrolyte secondary battery according to claim 10, wherein the phosphazene derivative of the formula (II) is represented by the following formula (IV):

$$(NPR^5{}_2)_n \qquad (IV)$$

(wherein $R^5$ is a monovalent substituent or a halogen element, and at least one of all $R^5$s is a fluorine-containing monovalent substituent or fluorine, provided that all $R^5$s are not fluorine, and n is 3-8).

13. A non-aqueous electrolyte secondary battery according to claim 9, wherein the phosphazene derivative is a solid at 25° C. and is represented by the following formula (V):

$$(NPR^6{}_2)_n \qquad (V)$$

(wherein $R^6$ is a monovalent substituent or a halogen element, and n is 3-6).

14. A non-aqueous electrolyte secondary battery according to claim 9, wherein the isomer of the phosphazene derivative is represented by the following formula (VI) and is an isomer of a phosphazene derivative represented by the following formula (VII):

(VI)

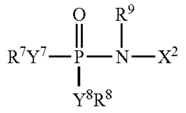

(VII)

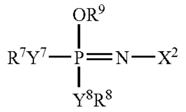

(in the formulae (VI) and (VII), $R^7$, $R^8$ and $R^9$ are independently a monovalent substituent or a halogen element, $X^2$ is a substituent containing at least one element selected from the group consisting of carbon, silicon, germanium, tin, nitrogen, phosphorus, arsenic, antimony, bismuth, oxygen, sulfur, selenium, tellurium and polonium, and $Y^7$ and $Y^8$ are independently a bivalent connecting group, a bivalent element or a single bond).

15. A method of producing a positive electrode for a non-aqueous electrolyte secondary battery, which comprises the steps of:

(I) a step of adding an aqueous solution of at least one alkaline earth metal hydroxide selected from the group consisting of an aqueous solution of magnesium hydroxide, an aqueous solution of calcium hydroxide and an aqueous solution of barium hydroxide to at least one lithium-containing composite oxide selected from the group consisting of $LiCoO_2$, $LiNiO_2$ and $LiMn_2O_4$ while cooling below 15° C. and then mixing them with stirring to prepare a mixed solution;

(II) a step of raising a temperature of the mixed solution to 45-55° C. at a rate of 1-10° C./min to reduce a water content of the mixed solution and further to 65-85° C. at a rate of 10-15° C./min to remove the water content of the mixed solution to thereby form a mixture of lithium-containing composite oxide and alkaline earth metal hydroxide;

(III) a step of raising a temperature of the mixture to 290-310° C. and holding at this temperature for a given time to convert the alkaline earth metal hydroxide into an alkaline earth metal oxide to thereby prepare powder for a positive electrode dispersing the alkaline earth metal oxide between particles of the lithium-containing composite oxide; and (IV) a step of shaping the powder for a positive electrode to produce a positive electrode.

16. A method of producing a positive electrode for a non-aqueous electrolyte secondary battery according to claim 15, wherein the aqueous solution of the alkaline earth metal hydroxide is an aqueous solution of calcium hydroxide.

* * * * *